US009838845B2

(12) United States Patent
Xiao et al.

(10) Patent No.: US 9,838,845 B2
(45) Date of Patent: Dec. 5, 2017

(54) METHOD AND APPARATUS FOR POSITIONING USER EQUIPMENT

(71) Applicant: Huawei Technologies Co., LTD., Shenzhen (CN)

(72) Inventors: Dengkun Xiao, Shenzhen (CN); Jie Cui, Shenzhen (CN); Jing Han, Shenzhen (CN); Yuanfeng Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 445 days.

(21) Appl. No.: 14/289,024

(22) Filed: May 28, 2014

(65) Prior Publication Data
US 2014/0274160 A1    Sep. 18, 2014

Related U.S. Application Data

(63) Continuation of application No. PCT/CN2012/080425, filed on Aug. 21, 2012.

(30) Foreign Application Priority Data

Nov. 29, 2011 (CN) .......................... 2011 1 0399659

(51) Int. Cl.
H04W 4/02     (2009.01)
H04W 64/00    (2009.01)
H04B 7/024    (2017.01)

(52) U.S. Cl.
CPC .......... *H04W 4/025* (2013.01); *H04W 64/00* (2013.01); *H04B 7/024* (2013.01)

(58) Field of Classification Search
CPC .... H04B 7/024; H04B 17/309; H04B 7/0632; H04B 7/0689; H04W 64/00; H04W 24/10;
(Continued)

(56) References Cited

U.S. PATENT DOCUMENTS 8,543,150 B2 *  9/2013  Choi ..................... H04B 7/024
                                                  370/252
2003/0216142 A1  11/2003  Wigren
(Continued)

FOREIGN PATENT DOCUMENTS

CN      1434663 A    8/2003
CN      1756421 A    4/2006
(Continued)

OTHER PUBLICATIONS

Machine Translation of CN101754361A, Gao.*
(Continued)

*Primary Examiner* — Matthew Sams
(74) *Attorney, Agent, or Firm* — Brinks Gilson & Lione

(57) ABSTRACT

Provided is a method for positioning a user equipment (UE). In the method, a positioning server determines that a UE is in a coordinated multi-point transmission (CoMP) state; requests a plurality of serving base stations in a CoMP set of the UE and the UE to measure a parameter related to positioning of the UE; receives the parameter related to the positioning of the UE from the plurality of serving base stations and the UE; and determines a location of the UE according to the received parameter.

9 Claims, 9 Drawing Sheets

(58) Field of Classification Search
CPC ... H04W 24/02; H04W 4/025; H04W 72/048; H04W 72/1231; H04J 11/0053; H04L 5/0035; H04L 5/0053; H04L 27/2613; H04L 5/0007; H04L 5/0048
See application file for complete search history.

(56) References Cited

U.S. PATENT DOCUMENTS

| | | | | |
|---|---|---|---|---|
| 2007/0161379 A1* | 7/2007 | Morisaki | G01S 5/0221 | 455/456.1 |
| 2009/0104917 A1* | 4/2009 | Ben Rached | H04W 64/00 | 455/456.1 |
| 2010/0273506 A1* | 10/2010 | Stern-Berkowitz | G01S 5/0009 | 455/456.1 |
| 2010/0304682 A1* | 12/2010 | Choi | H04B 7/024 | 455/63.1 |
| 2010/0323718 A1* | 12/2010 | Jen | H04W 64/00 | 455/456.1 |
| 2010/0323719 A1* | 12/2010 | Jen | H04W 64/00 | 455/456.1 |
| 2010/0323720 A1* | 12/2010 | Jen | H04B 7/2606 | 455/456.1 |
| 2011/0034171 A1* | 2/2011 | Choi | H04B 7/024 | 455/436 |
| 2011/0269459 A1* | 11/2011 | Koo | H04W 24/10 | 455/434 |
| 2011/0304506 A1* | 12/2011 | Choi | G01S 5/021 | 342/387 |
| 2012/0040691 A1 | 2/2012 | Han et al. | | |
| 2012/0083278 A1* | 4/2012 | Kazmi | H04W 64/00 | 455/440 |
| 2012/0257515 A1* | 10/2012 | Hugl | H04W 24/10 | 370/252 |
| 2013/0029669 A1* | 1/2013 | Boudreau | H04W 16/28 | 455/444 |
| 2013/0194942 A1* | 8/2013 | Hu | G01S 5/04 | 370/252 |
| 2014/0078973 A1* | 3/2014 | Kazmi | H04W 8/22 | 370/329 |
| 2014/0126530 A1* | 5/2014 | Siomina | H04W 52/146 | 370/330 |

FOREIGN PATENT DOCUMENTS

| | | | | |
|---|---|---|---|---|
| CN | 101635950 A | * | 1/2010 | ......... H04J 11/0053 |
| CN | 101754361 A | | 6/2010 | |
| CN | 101931439 A | | 12/2010 | |
| CN | 101931996 A | | 12/2010 | |
| CN | WO 2013078888 A1 | * | 6/2013 | ........... H04W 64/00 |
| WO | WO 2010/117220 A2 | | 10/2010 | |

OTHER PUBLICATIONS

Lte, "3$^{rd}$ Generation Partnership Project; Technical Specification Group Radio Access Network; Evolved Universal Terrestrial Radio Access Network (E-UTRAN); X2 application protocol (X2AP)" (Release 10) 3GPP TS 36.423, V10.3.0, Sep. 2011, 132 pages.

* cited by examiner

METHOD AND APPARATUS FOR POSITIONING USER EQUIPMENT

CROSS-REFERENCE TO RELATED APPLICATIONS

This application is a continuation of International Application No. PCT/CN2012/080425, filed on Aug. 21, 2012, which claims priority to Chinese Patent Application No. 201110399659.5, filed on Nov. 29, 2011, both of which are hereby incorporated by reference in their entireties.

TECHNICAL FIELD

The present disclosure relates to a wireless communication system, and more particularly to a method and an apparatus for positioning a user equipment (UE, User Equipment).

BACKGROUND

A positioning technology is a technology adopted for determining a geographical location of a UE, which can directly or indirectly obtain the position information of the UE using resources of a wireless communication network. There are three standard manners for positioning a user equipment in a third generation partnership project long term evolution (3GPP LTE, Third Generation Partnership Project Long Term Evolution): network-assisted global navigation satellite system (GNSS, Global Navigation Satellite System) positioning, observed time difference of arrival (OTDOA, Observed Time Difference Of Arrival) positioning, and enhanced cell identification (e-CID, Enhanced Cell Identification) positioning.

A positioning algorithm for positioning a UE in the LTE is generally to detect characteristic parameters (such as signal field strength, a time difference of arrival of a propagation signal and an angle-of-arrival of a signal) of a radio wave propagation signal between the UE and a base station, and then estimate a location of the UE according to a relevant positioning algorithm. In the GNSS positioning method, the UE is required to have a wireless receiver for receiving a GNSS signal, and the GNSS can be specifically implemented as a global positioning system (GPS, Global Positioning System) positioning, a Galileo (Galileo) positioning, and etc. Both the OTDOA and the e-CID positioning are types of network positioning, and are mainly to detect characteristic parameters of radio resources within a mobile communication system, and then estimate the location of the UE according to a positioning algorithm. In the OTDOA positioning, the UE receives downlink positioning reference signals (PRS, Positioning Reference Signal) from a plurality of base stations, performs a timing measurement, and reports to a time difference of arrival for PRS between base stations, and a geographical location of the UE is obtained through calculation on a network positioning server. It is necessary for the OTDOA to perform a synchronization process between base stations before measurement.

The e-CID positioning is a positioning manner easily implemented in a cellular mobile communication. In a cell identification (CID, Cell Identification) positioning, each cell has its own specific cell identification (ID, Identification), when entering a certain cell, the UE needs to register in a current serving cell, and then there will be a corresponding cell ID in system data. The system determines the location of the UE according to the acquired ID of the cell where the UE is located. In the e-CID positioning, the current serving cell of the UE acquires information, such as round-trip time (RTT, Round Trip Time) of the UE, namely, timing advance (TA, Timing Advance), and angle of arrival (AOA, Angle of Arrival) etc. to further improve an accuracy of the positioning. As shown in FIG. 1, after acquiring the RTT of the UE, the serving cell can calculate a distance between a serving base station and the UE, and further determines the location of the UE by using the AOA between the serving base station and the UE, and the location of the serving base station.

As described above, the e-CID positioning technology adds AOA estimation and RTT estimation on the basis of the CID, and thus improves the accuracy of the positioning on the basis of the CID. However, a prerequisite for the serving base station to acquire the AoA information is that, the base station needs to be equipped with a smart antenna array, and a relatively higher requirement should be satisfied by the smart antenna. Therefore, in the e-CID positioning method, if there is no AoA value, only a distance S between the UE and the base station can be acquired just by the RTT information, that is, on the basis of the CID positioning, the UE is further defined on a circle or an arc centered at the current base station with a radius of S, and cannot be accurately positioned. In addition, only one serving base station measures the distance RTT and AoA, so the accuracy of the positioning will be affected when the smart antenna is in a lower accuracy or the communication environment changes.

Accordingly, there is a need to further improve the e-CID positioning in the prior art.

SUMMARY

Embodiments of the present disclosure use characteristics of coordinated multi-point transmission (CoMP, Coordinated Multiple Point transmission/reception) to facilitate the improvement of e-CID positioning. All the base stations in a CoMP set can function as a serving base station of the UE to make RTT estimation and AoA estimation for the UE, in this way, RTT and AoA for the UE can be obtained through a plurality of serving base stations to make estimation for a location of the UE, and thereby, an accuracy and stability of the positioning can be improved.

In one aspect, embodiments of the present disclosure provide a positioning method implemented in a positioning server, including: determining that a user equipment (UE) is in a coordinated multi-point transmission (CoMP) state; requesting a plurality of serving base stations in a CoMP set of the UE and the UE to respectively measure a parameter related to positioning of the UE; receiving the parameter related to positioning of the UE from the plurality of serving base stations and the UE; and determining a location of the UE according to the received parameter.

In another aspect, embodiments of the present disclosure provide a method for helping positioning, which is implemented in a primary serving base station which serves a user equipment (UE), including: receiving, from a positioning server, an inquiry message whether the UE is in a coordinated multi-point transmission (CoMP) state; reporting, to the positioning server, that the UE is in the CoMP state; receiving, from the positioning server, a positioning measurement request with respect to the UE; transmitting, to the UE and/or other serving base station in the CoMP set, the positioning measurement request; receiving, from the UE and/or the other serving base station, the parameter related to positioning of the UE measured by the UE relative to the plurality of serving base stations in the CoMP set and/or the parameter related to positioning of the UE measured by the other serving base station relative to the UE, where the plurality of serving base stations include the primary serving base station and the other serving base station; transmitting, to the positioning server, the parameter related to positioning of the UE measured by the primary serving base station and the parameter related to positioning of the UE measured by the UE and/or the other serving base station.

In another aspect, embodiments of the present disclosure provide a method for helping positioning, which is implemented in a user equipment (UE), including: receiving a positioning measurement request which instruct the UE to measure a parameter related to positioning of the UE relative to a plurality of serving base stations in a coordinated multi-point transmission (CoMP) set of the UE; measuring the parameter related to the positioning of the UE relative to the plurality of serving base stations; and transmitting the parameter related to the positioning of the UE measured by the UE relative to the plurality of serving base stations.

In another aspect, embodiments of the present disclosure provide a positioning server, including: a determining unit, configured to determine that a user equipment (UE) is in a coordinated multi-point transmission (CoMP) state; a first transceiving unit, configured to, after the determining unit determines that the UE is in the CoMP state, transmit a request message for requesting a plurality of serving base stations in a CoMP set of the UE and the UE to measure a parameter related to positioning of the UE, and receive the parameter related to positioning of the UE from the plurality of serving base stations and the UE; and a positioning unit, configured to determine a location of the UE according to the parameter received by the first transceiving unit.

In another aspect, embodiments of the present disclosure provide a primary serving base station for serving a user equipment (UE), including: a second transceiving unit, configured to receive, from a positioning server, an inquiry message whether the UE is in a coordinated multi-point transmission (CoMP) state; a reporting unit, configured to, in response to the inquiry message received by the second transceiving unit, report to the positioning server that the UE is in the coordinated multi-point transmission (CoMP) state; where, the second transceiving unit is further configured to: receive, from the positioning server, a positioning measurement request with respect to the UE; transmit, to the UE and/or other serving base station in a CoMP set, the positioning measurement request; receive, from the UE and/or the other serving base station, a parameter related to positioning of the UE measured by the UE relative to a plurality of serving base stations in the CoMP set and/or a parameter related to the positioning of the UE measured by the other serving base station relative to the UE, where the plurality of serving base stations include the primary serving base station and the other serving base station; and transmit, to the positioning server, a parameter related to the positioning of the UE measured by the primary serving base station and the parameter related to the positioning of the UE measured by the UE and/or the other serving base station.

In another aspect, embodiments of the present disclosure provide a user equipment (UE), including: a third transceiving unit, configured to receive a positioning measurement request which instructs the UE to measure a parameter related to positioning of the UE relative to a plurality of serving base stations in a coordinated multi-point transmission (CoMP) set of the UE; a measuring unit, configured to, according to the positioning measurement request received by the third transceiving unit, measure the parameter related to the positioning of the UE relative to the plurality of serving base stations, where the third transceiving unit is further configured to transmit the parameter related to the positioning of the UE measured by the measuring unit relative to the plurality of serving base stations.

In another aspect, embodiments of the present disclosure provide a positioning server, including: a processor, configured to determine that a user equipment (UE) is in a coordinated multi-point transmission (CoMP) state; request a plurality of serving base stations in a CoMP set of the UE and the UE to measure a parameter related to positioning of the UE; receive the parameter related to the positioning of the UE from the plurality of serving base stations and the UE; and determine a location of the UE according to the received parameter; and a memory connected to the processor.

In another aspect, embodiments of the present disclosure provide a primary serving base station for serving a user equipment (UE), including: a processor, configured to receive, from a positioning server, an inquiry message whether the UE is in a CoMP state; in response to the inquiry message, report, to the positioning server, that the UE is in the coordinated multi-point transmission (CoMP) state; receive, from the positioning server, a positioning measurement request with respect to the UE; transmit, to the UE and/or other serving base station in a CoMP set, the positioning measurement request; receive, from the UE and/or the other serving base station, a parameter related to positioning of the UE measured by the UE relative to a plurality of serving base stations in the CoMP set and/or a parameter related to the positioning of the UE measured by the other serving base station relative to the UE, where the plurality of serving base stations include a primary serving base station and the other serving base station; transmit, to the positioning server, a parameter related to the positioning of the UE measured by the primary serving base station and the parameter related to the positioning of the UE measured by the UE and/or the other serving base station; and a memory connected to the processor.

In another aspect, embodiments of the present disclosure provide a user equipment (UE), including: a processor, configured to receive a positioning measurement request for instructing the UE to measure a parameter related to positioning of the UE relative to a plurality of serving base stations in a coordinated multi-point transmission (CoMP) set of the UE; according to the positioning measurement request, measure the parameter related to the positioning of the UE relative to the plurality of serving base stations in the CoMP set of the UE; and transmit the parameter related to the positioning of the UE measured by the UE relative to the plurality of serving base stations; and a memory connected to the processor.

In another aspect, embodiments of the present disclosure provide a wireless communication device, including: a memory, for storing instructions; a processor, configured to execute the instructions, so that the wireless communication device can implement the above method of the present disclosure.

In another aspect, embodiments of the present disclosure provide a machine-readable medium, where instructions are stored therein, so that when a machine executes the instructions, the machine can implement the above method of the present disclosure.

In another aspect, embodiments of the present disclosure provide a computer program for implementing the above method of the present disclosure.

Other objects and effects of the present disclosure, together with a more comprehensive understanding of embodiments the present disclosure, will be more apparent and understandable with reference to the description of the accompanying drawings and the contents of the claims.

BRIEF DESCRIPTION OF DRAWINGS

The present disclosure will be described hereinafter in detail by way of embodiments with reference to the accompanying drawings, in which.

Throughout all the above accompanying drawings, the same reference numbers indicate the similar or corresponding features or functions.

DESCRIPTION OF EMBODIMENTS

The method for helping positioning provided in embodiments of the present disclosure will be described in detail hereinafter. The term "and/or" as used herein refers to and encompasses any and all possible combinations of one or more of the associated listed items.

Figure 1:
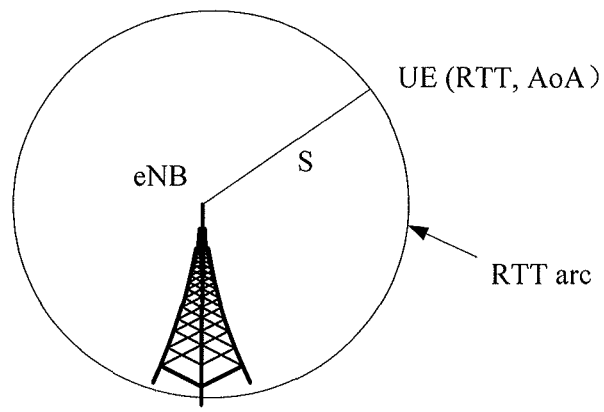
FIG. 1 is a schematic diagram of a scenario of e-CID positioning in the prior art.
Figure 2:
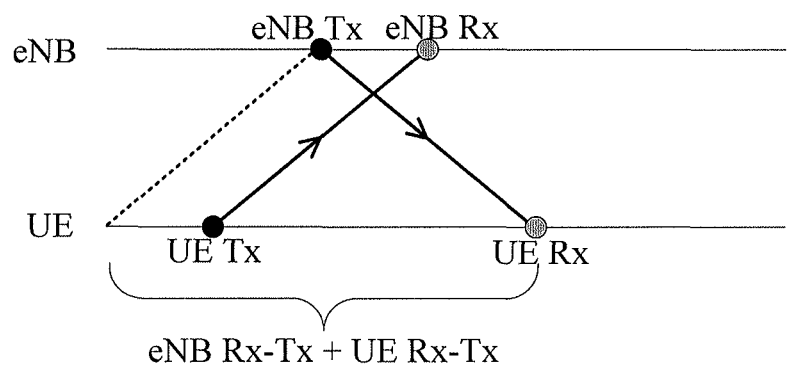
FIG. 2 is a schematic diagram of RTT estimation adopted in e-CID positioning.

FIG. 2 shows RTT estimation adopted in e-CID positioning technology. As shown, a UE and its serving base station (such as an evolved Node B, eNB, e-NodeB) are synchronized. UE Tx indicates a time when the UE transmits an uplink reference signal, eNB Rx indicates a time when the uplink reference signal arrives at the serving eNB; eNB Tx indicates a time when the eNB transmits a downlink reference signal, and UE Rx indicates a time when the downlink reference signal arrives at the UE. In order to obtain the RTT of the UE, a desirable situation is that, the eNB makes TA adjustment for the transmission time of the UE to adjust it to the dashed position; in this way, the time when the uplink signal transmitted by the UE arrives at the eNB is just the time when the eNB transmits the downlink signal. As can be seen from the diagram, the desirable RTT time is a reception time minus a transmission time (Rx-Tx) of the eNB plus Rx-Tx of the UE. Since the UE and the eNB are synchronized, both the Rx and the Tx herein correspond to a transmission time and a reception time of the same subframe; that is, the RTT time is a reception time of an uplink signal of the eNB minus a transmission time of a downlink signal of the same subframe (Rx-Tx) plus a reception time of the downlink signal minus a transmission time of the uplink signal (Rx-Tx) of the UE. The distance S between the UE and the serving eNB shown in FIG. 1 can be calculated by using the estimated RTT. The serving eNB further can obtain an AoA of the UE via its array smart antenna. Thereby, the location of the UE can be determined through the distance S, the angle of arrival AOA and the location of the eNB. Since the UE only has one serving eNB, and the AoA and Rx-Tx of the eNB only can be obtained by the unique serving base station. However, if the position is estimated by a distance between a plurality of eNBs and the UE, an accuracy of the positioning can be further improved on the basis of the e-CID.

Figure 3:
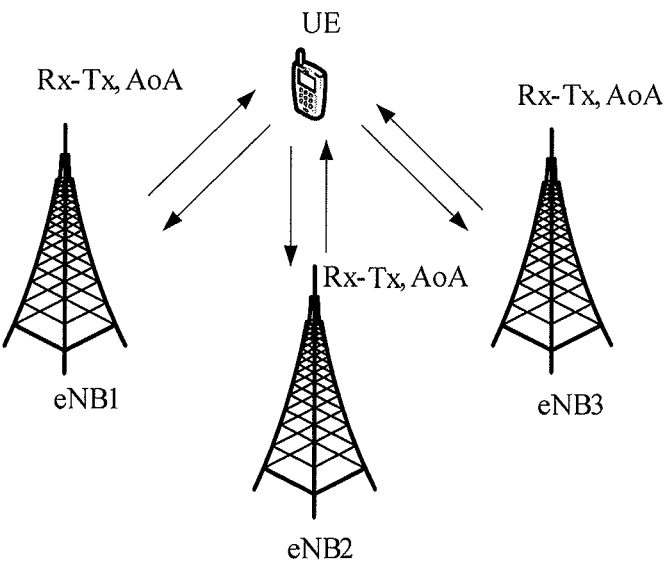
FIG. 3 is a schematic diagram of helping positioning a UE in a CoMP scenario according to an embodiment of the present disclosure.

The characteristic in a CoMP scenario is utilized in the present disclosure to improve e-CID positioning. Since intra-frequency interference exists among different cells in a multi-cell scenario of the LTE, the CoMP scenario is introduced to reduce the intra-frequency interference and increase throughput of the system. FIG. 3 shows a schematic diagram of helping positioning a UE in a CoMP scenario, in the CoMP scenario, since the base stations in the CoMP set and the associated UE are synchronized, (Rx-Tx) measurement at the eNB side of the UE can be made just like the serving base station of the UE, and optionally AoA estimation for the UE can be made. As described above, RTT between the UE and each eNB can be estimated according to Rx-Tx measured by each eNB (namely, the time when the uplink reference signal transmitted by the UE arrives at the eNB minus the time when the eNB transmits the downlink reference signal in the same subframe) and Rx-Tx measured by the UE (namely, the time when the downlink reference signal arrives at the UE minus the time when the UE transmits the uplink reference signal), then the distance between each eNB and the UE can be obtained, and therefore UE can be positioned via the plurality of base stations in the CoMP set.

Although the UE positioning is described in specific embodiments, it can be appreciated by persons skilled in the art that, the UE can represent any device, such as a mobile terminal, a mobile station, a handheld device, or any other type of device to be positioned.

Figure 4A:
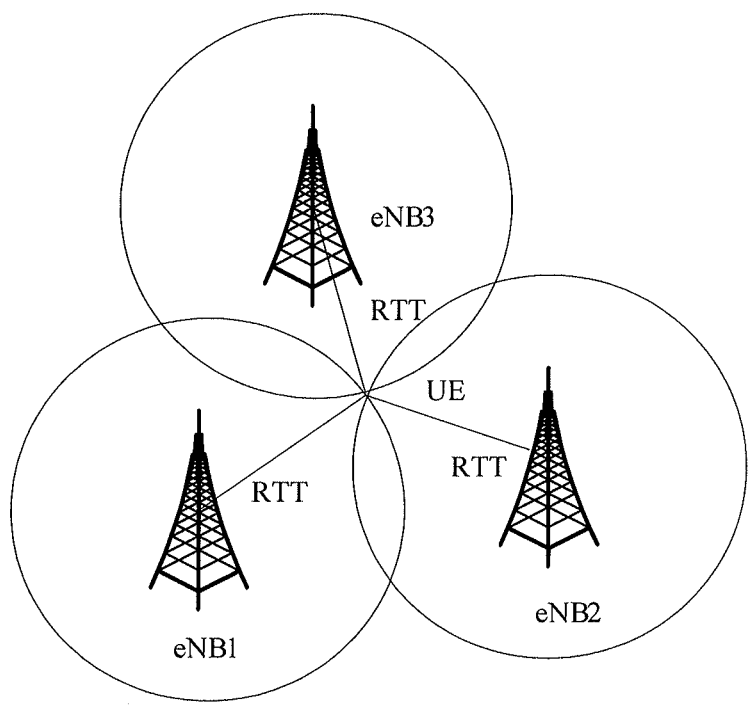
FIG. 4A and FIG. 4B are schematic diagrams of an exemplary method for positioning a UE in a CoMP scenario according to an embodiment of the present disclosure.

FIG. 4A shows an exemplary method of positioning a UE in a CoMP scenario. Since all the base stations in the CoMP set can make Rx-Tx measurement at the eNB side, as shown, Rx-Tx at the eNB side respectively measured by three eNBs in the CoMP set relative to the UE and Rx-Tx at the UE side respectively measured by the UE relative to the three eNBs can be utilized to obtain three RTTs of the UE relative to the three eNBs, and three RTTs can determine a location of the UE by means of trilateration on the premise that no AoA information is acquired. Herein, it should be noted that, although a case of three eNBs is described in the example, implementation of the present disclosure is not limited to the case of three eNBs, and any number of multiple eNBs can be used to improve the accuracy of e-CID positioning.

For convenience of description, FIG. 4A shows a desirable case, that is, three arcs determined by the RTT intersect at a point, and thereby a location of the UE is determined.

In practice, a location of intersecting at one point may not be obtained due to changing of radio environment and error of measurement. For example, also take the case of three eNBs as an example, when three arcs centered at the three eNBs fail to intersect at one point, but there are two intersecting points between each two of them, and therefore, there are six intersecting point all together, and three proximate intersecting points can be determined therefrom, and a range determined by the three proximate intersecting points can be taken as the location of the UE. For another example, an average position or a weighted average position for the three proximate intersecting points can be taken as the location of the UE. For another example, an average position or a weighted average position for the overall six proximate intersecting points can be taken as the location of the UE. It should be noted that, the above method for determining the location of the UE is exemplary, and any obvious modification shall fall within the protection scope of the present disclosure.

Based on the method provided in embodiments of the present disclosure, obtaining a plurality of AOAs in the CoMP scenario can further improve the accuracy of the UE positioning.

Figure 4B:
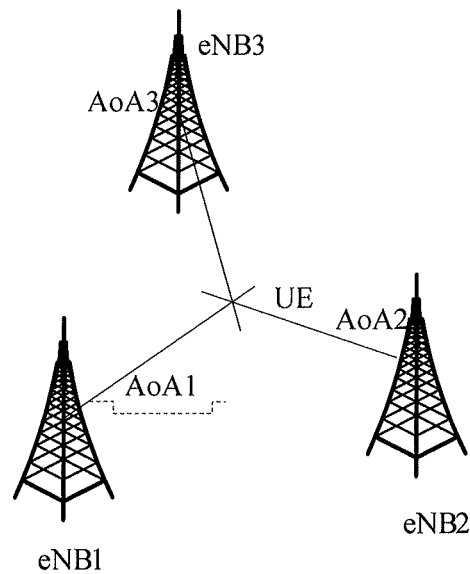

FIG. 4B shows an exemplary method of positioning a UE in a CoMP scenario. In this example, the base stations in the CoMP set can make AoA measurement for the UE. The AoA can be defined as an angle between a direction of arrival of UE's uplink signal arriving at the eNB (as shown by the solid line) and a reference direction (as shown by the dashed line, such as a horizontal ray pointing right with initial point eNB, or rays with other angles). It should be noted that, it is merely to depict the reference direction line of eNB1 for the sake of simplicity, and eNB2 and eNB3 also have reference direction lines with the same angle. As shown, the three eNBs in the CoMP set respectively measure three AoAs of the UE relative to the eNB by means of a smart antenna array. According to a geometric algorithm, such as analytical geometry, the location of the UE can be determined according to three rays determined by a location of the eNB and the AoA angles. Herein, it should be noted that, although a case of three eNBs is described in the example, implementation of the present disclosure is not limited to the case of three eNBs, and any number of multiple eNBs can be utilized to improve the accuracy of e-CID positioning. For example, the location of the UE also can be determined by two rays derived with the two eNBs.

For convenience of description, FIG. 4B shows a desirable case, that is, three rays determined by the AoA intersect at a point, and thereby a location of the UE is determined. In practice, a location of intersecting at a point probably cannot be obtained due to changing of radio environment and error of measurement. For example, also take the case of three eNBs as an example, when three rays with the three eNBs as the initial points fail to intersect at one point, but there are one intersecting point between each two of them, and therefore, there are three intersecting points in total, and a range determined by the three intersecting points can be taken as the location of the UE. For another example, an average position or a weighted average position of the three intersecting points can be taken as the location of the UE. It should be noted that, the above method for determining the location of the UE is exemplary, and any obvious modification shall fall within the protection scope of the present disclosure. For example, a combination of a plurality of RTTs and AoAs obtained by a plurality of base stations in the CoMP scenario can further improve the estimation for the location of the UE. For example, the plurality of RTTs and AoAs obtained by the plurality of base stations are comprehensively utilized to determine a plurality of locations, by means of a weighted average (also referred to as a compensation) method, then stability of the estimation for the location of the UE can be improved, and the accuracy of the positioning will not be severely deteriorated by a sudden change of the radio environment in a certain area.

The improvement on the accuracy of the positioning is ultimately brought about by utilizing a property of the CoMP scenario, in other words, embodiments of the present disclosure provide a method of helping improve UE positioning utilizing the property of the CoMP scenario.

FIG. 5A to FIG. 5F are schematic diagrams showing an embodiment of helping improve UE positioning according to the present disclosure.

In the CoMP scenario, the current primary serving eNB of the UE either can, together with other neighboring eNBs in the CoMP set, serve as a serving base station, in which case, a positioning server, such as an enhanced serving mobile location center (e-SMLC, Enhanced Serving Mobile Location Centre) can perform signaling interaction with these eNBs respectively; or, the primary serving eNB can, together with other nodes (such as, access point (AP, Access Point), remote radio head (RRH, Remote Radio Head)), serve as a serving base station, in which case, the e-SMLC performs signaling interaction with the primary serving eNB, and then the primary serving eNB forwards measuring instructions to its subordinate nodes. On the other hand, the e-SMLC performs signaling interaction with the UE in two manners, one is that the e-SMLC directly notifies the UE of making positioning measurement via LTE positioning protocol (LPP, LTE Positioning Protocol), for example, respectively making e-CID measurement relative to the plurality of serving base stations in the CoMP set, the other is that the e-SMLC firstly requests the eNB to make positioning measurement via LTE positioning protocol a (LPPa, LTE Positioning Protocol A), and then the eNB notifies the UE of making positioning measurement via radio resource control (RRC, Radio Resource Control) signaling. After the UE and the serving base station complete respective positioning measurement, measurement results, such as Rx-Tx measured by the UE relative to each serving base station, and Rx-Tx and/or AoA measured by each serving base station relative to the UE, are reported to the positioning server and the positioning server determines a location of the UE by using the measured parameters.

Figure 5A:
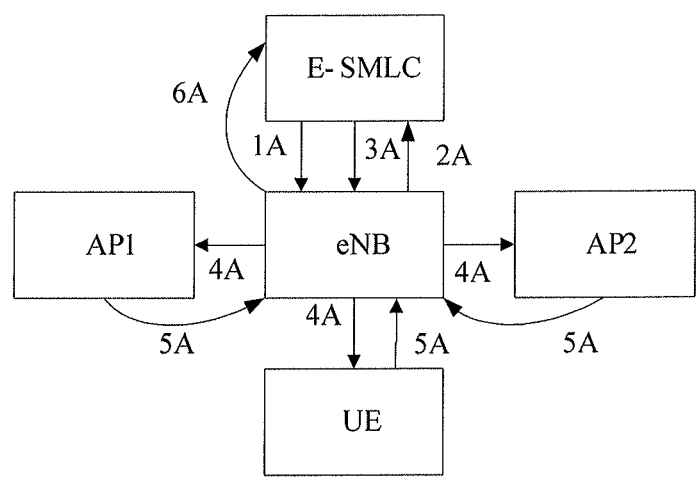
FIG. 5A to FIG. 5F are schematic diagrams of an exemplary process of facilitating to improve UE positioning according to an embodiment of the present disclosure.

FIG. 5A is a schematic diagram of a method for helping improve UE positioning according to an embodiment of the present disclosure. In this embodiment, the primary serving eNB and other nodes APs jointly serve as base stations to form a CoMP set associated with the UE. In step 1A, the e-SMLC transmits, via LPPa signaling, an inquiry message to the primary serving eNB for inquiring the CoMP state of the primary serving eNB, so as to determine whether the UE is located in a CoMP state or a CoMP serving state. In step 2A, the eNB responds its state to the e-SMLC via LPPa signaling. In step 3A, if the e-SMLC determines that the UE is in the CoMP state, the e-SMLC transmits a positioning measurement request message to the primary serving eNB via the LPPa signaling, for requesting the plurality of base stations in the CoMP set to make measurement related to the UE positioning, such as measurement of Rx-Tx value and/or AoA at the base station side relative to the UE. In step 4A, the primary serving eNB transmits a positioning measurement request message to the UE via RRC signaling, where the message indicates with which base stations the UE needs to make positioning measurement, for example, the message notifies the UE of all or a part of base stations included in the CoMP set, so as to instruct the UE to make positioning measurement relative to the plurality of base stations in the CoMP set, for example, measurement of Rx-Tx value at the UE side relative to the plurality of base stations. Meanwhile, in step 4A, the primary serving eNB transmits a positioning measurement request to its subordinate APs (such as AP1, AP2) in the CoMP set, for instructing the subordinate AP to make positioning measurement relative to the UE. In step 5A, the UE and the subordinate APs report measurement results to the primary serving eNB, here, the UE can report the measurement results to the primary serving eNB via the RRC signaling, and the signaling between the eNB and the subordinate APs is associated with configuration of the AP, and for different types of APs, corresponding signaling can be adopted. In step 6A, the eNB reports the measurement results to the e-SMLC via the LPPa signaling. After receiving measurement results from the plurality of serving base stations and the UE, the e-SMLC can use multiple sets of parameters to determine a location of the UE, for example, via a method for determining the location of the UE described above.

In this embodiment, measurement results of both the AP and the UE are reported to the e-SMLC via the primary serving eNB. The e-SMLC firstly requests, via LPPa signaling, the primary serving eNB to make positioning measurement, the primary serving eNB forwards measuring instructions to other subordinate nodes; then the primary serving eNB notifies, via RRC signaling, the UE of making positioning measurement; the UE reports measurement results to the primary serving eNB via the RRC signaling; each node transmits measurement results to the primary serving eNB, and the primary serving eNB reports measurement results to the e-SMLC via the LPPa after summarization.

Figure 5B:
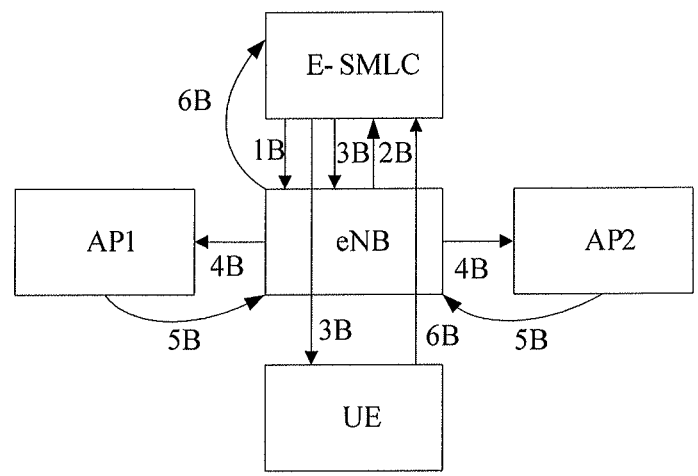

FIG. 5B is a schematic diagram of a method for helping improve UE positioning according to an embodiment of the present disclosure. This embodiment differs from the embodiment shown in FIG. 5A in that, the e-SMLC directly transmits a positioning measurement request to the UE via LPP signaling, so as to instruct the UE to make positioning measurement relative to the plurality of base stations in the CoMP set, and the UE directly reports the measurement results to the e-SMLC via the LPP signaling. For example, in step 1B, the e-SMLC inquires the CoMP state of the primary serving eNB. In step 2B, the primary serving eNB responds to the e-SMLC. In step 3B, the e-SMLC transmits a positioning measurement request message to the primary serving eNB via the LPPa signaling, for requesting the primary serving eNB and its subordinate APs to make positioning measurement for the UE, and meanwhile, the e-SMLC transmits a positioning measurement request message to the UE via the LPP signaling, for requesting the UE to make positioning measurement relative to the plurality of base stations in the CoMP set, and the plurality of base stations can include the primary serving eNB and its subordinate APs. In step 4B, the primary serving eNB forwards the positioning measurement request to its subordinate APs, for requesting the APs to make positioning measurement for the UE. In step 5B, the APs report the measurement results to the primary serving eNB. In step 6B, the primary serving eNB and the UE report the measurement results to the e-SMLC respectively via LPPa and LPP.

Figure 5C:
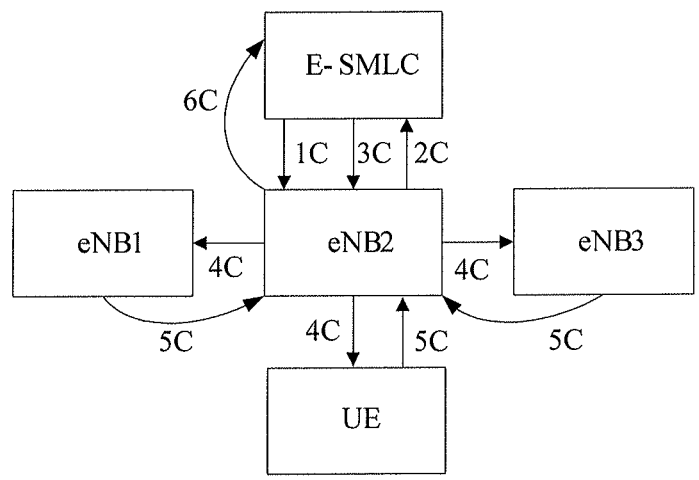

FIG. 5C is a schematic diagram of a method for helping improve UE positioning according to an embodiment of the present disclosure. This embodiment differs from the embodiment shown in FIG. 5A in that, the primary serving eNB and other neighboring eNBs, serve as serving base stations jointly to form a CoMP set. For example, in step 1C, the e-SMLC inquires the CoMP state of the primary serving eNB. In step 2C, the primary serving eNB responds to the e-SMLC. In step 3C, the e-SMLC transmits a positioning measurement request message to the primary serving eNB via the LPPa signaling, for requesting the primary serving eNB and other serving base stations in the same CoMP set to make positioning measurement for the UE. In step 4C, the primary serving eNB transmits a positioning measurement request message to the UE via RRC signaling, so as to instruct the UE to make positioning measurement relative to the plurality of base stations in the CoMP set, and meanwhile, the primary serving eNB transmits a positioning measurement request to other neighboring eNBs in the CoMP set via, such as an X2 interface, so as to instruct other neighboring eNBs to make positioning measurement for the UE. In step 5C, the UE and other neighboring eNBs report the measurement results to the primary serving eNB respectively via RRC signaling and X2 interface. In step 6C, the eNB reports the measurement results to the e-SMLC via LPPa signaling.

Figure 5D:
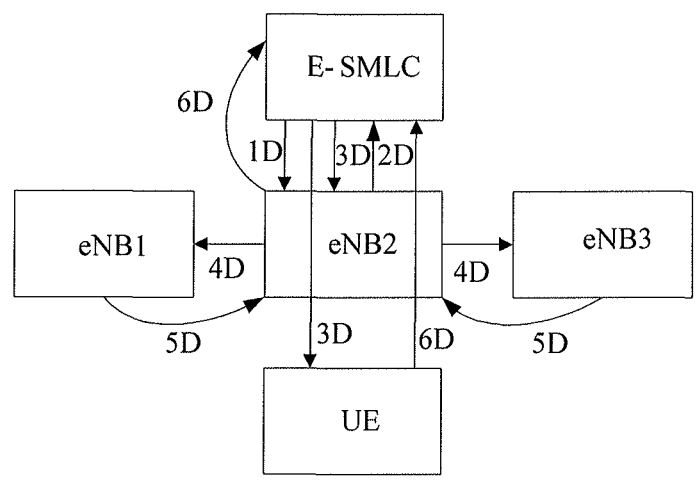

FIG. 5D is a schematic diagram of a method for helping improve UE positioning according to an embodiment of the present disclosure. This embodiment differs from the embodiment shown in FIG. 5B in that, the primary serving eNB and other neighboring eNBs jointly serve as base stations to form a CoMP set. For example, in step 1D, the e-SMLC inquires the CoMP state of the primary serving eNB. In step 2D, the primary serving eNB responds to the e-SMLC. In step 3D, the e-SMLC transmits a positioning measurement request message to the primary serving eNB via the LPPa signaling, for requesting the primary serving eNB and other serving base stations in the same CoMP set to make positioning measurement for the UE, and meanwhile, the e-SMLC transmits a positioning measurement request message to the UE via the LPP signaling, for requesting the UE to make positioning measurement relative to the plurality of base stations in the CoMP set. In step 4D, the primary serving eNB transmits a positioning measurement request to other neighboring eNBs in the CoMP set via an X2 interface, for requesting the other neighboring eNBs to make positioning measurement for the UE. In step 5D, the neighboring eNBs reports the measurement results to the primary serving eNB via X2 interface. In step 6D, the primary serving eNB and the UE report the measurement results to the e-SMLC respectively via LPPa and LPP signaling.

Figure 5E:
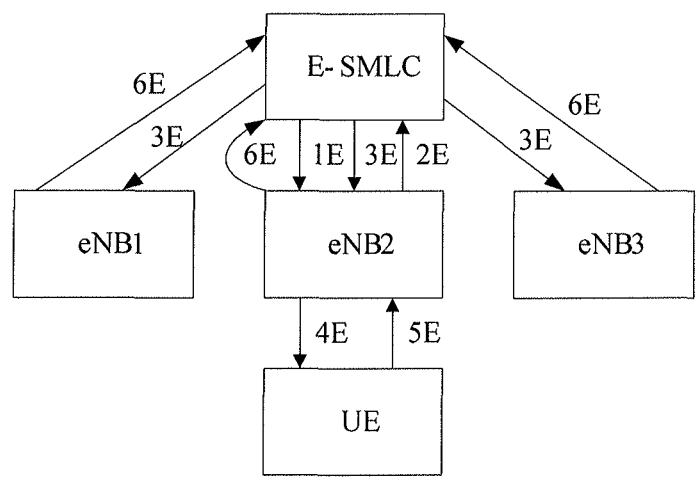

FIG. 5E is a schematic diagram of a method for helping improve UE positioning according to an embodiment of the present disclosure. This embodiment differs from the embodiment shown in FIG. 5C in that, the e-SMLC directly transmits a positioning measurement request to other eNBs in the CoMP set via LPPa signaling, so as to instruct the other eNB to make positioning measurement for the UE, and the other eNBs directly report the measurement results to the e-SMLC via LPPa signaling. For example, in step 1E, the e-SMLC inquires the CoMP of the primary serving eNB. In step 2E, the primary serving eNB responds to the e-SMLC. In step 3E, the e-SMLC transmits a positioning measurement request message to the primary serving eNB and other serving base stations in the same CoMP set via the LPPa signaling, for requesting the plurality of eNBs in the CoMP set to make positioning measurement for the UE, and the plurality of eNBs can include the primary serving eNB and other eNBs in the CoMP set. In step 4E, the primary serving eNB transmits a positioning measurement request message to the UE via RRC signaling, so as to instruct the UE to make positioning measurement relative to the plurality of base stations in the CoMP set. In step 5E, the UE reports the measurement results to the primary serving eNB via RRC signaling. In step 6E, the primary serving eNB and the neighboring eNBs report the measurement results to the e-SMLC via LPPa signaling, for example, the primary serving eNB reports Rx-Tx value and/or AoA measured by itself for the UE and Rx-Tx value measured by the UE relative to the plurality of eNBs to the e-SMLC, and other neighboring eNBs report Rx-Tx value and/or AoA measured by themselves for the UE to the e-SMLC.

Figure 5F:
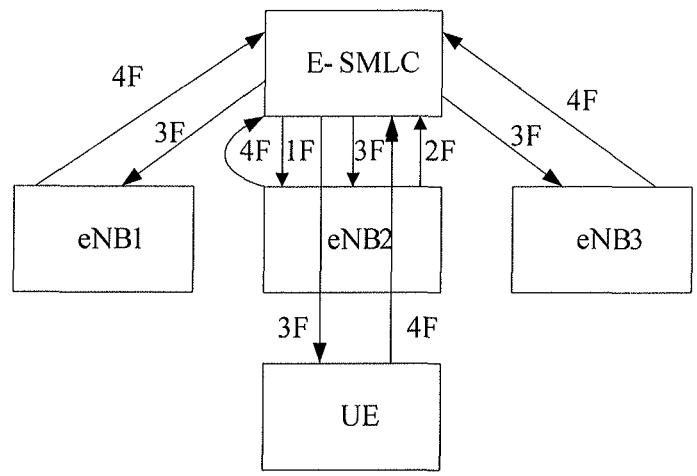

FIG. 5F is a schematic diagram of a method for helping improve UE positioning according to an embodiment of the present disclosure. In this embodiment, the e-SMLC directly transmits a positioning measurement request to the plurality of eNBs in the CoMP set via LPPa signaling, directly transmits a positioning measurement request to the UE via LPP signaling, and the plurality of eNBs and the UE directly report the measurement results respectively via LPPa signaling and LPP signaling to the e-SMLC. For example, in step 1F, the e-SMLC inquires the CoMP state of the primary serving eNB. In step 2F, the primary serving eNB responds to the e-SMLC. In step 3F, the e-SMLC transmits a positioning measurement request message to the plurality of eNBs in the CoMP set via the LPPa signaling, for requesting the plurality of eNBs to make positioning measurement for the UE, and meanwhile, the e-SMLC transmits a positioning measurement request message to the UE via the LPP signaling, for instructing the UE to make positioning measurement relative to the plurality of base stations in the CoMP set. In step 4F, the UE reports measurement results to the e-SMLC via LPP signaling, and meanwhile, the primary serving eNB and the neighboring eNBs report the measurement results to the e-SMLC via LPPa signaling.

The signaling adopted in the above embodiments is further improved on the basis of embodiments of the present disclosure, so as to help implement positioning for the UE. Examples of the adopted signaling will be described below.

(1) LPP Signaling

In an LPP signaling message ECID-RequestLocationInformation (enhanced cell identifier-request location information), transmitted by the e-SMLC, information for acknowledging a CoMP scenario, measCoMPset (3) is added, and the ECID-RequestLocationInformation message after adding the information is as follows. When the bit of measCoMPset in a bit stream is 1, it is indicated that the UE is currently served in the CoMP set, and therefore, UE makes positioning measurement relative to all the plurality of eNBs in the CoMP set, such as the measurement of Rx-Tx at the UE side.

```
-- ASN1START
    ECID--RequestLocationInformation ::= SEQUENCE {
        requestedMeasurements   BIT STRING {   rsrpReq    (0),
                                               rsrqReq    (1),
                                               rsrxTxReq  (2)
                                               measCoMPset (3)}),
        ...
    }
-- ASN1STOP
```

After making measurement, the UE reports measurement results of Rx-Tx at the UE side relative to the plurality of cells in the LPP signaling message ECID-ProvideLocationInformation (enhanced cell identifier-provide location information).

(2) LPPa Signaling 2.1 A new LPPa signaling message E-CID information request (enhanced cell identifier information request) is provided. The e-SMLC can request the eNB to report its capability via the signaling message, before positioning (such as e-CID positioning), the e-SMLC firstly inquires capability of the eNB, such as a CoMP state of the eNB, to determine the CoMP state of the target UE. The signaling is shown as follows:

E-CID Information Request

| IE/Group Name | Presence | Range | IE type and reference | Semantics description | Criticality | Assigned Criticality |
|---|---|---|---|---|---|---|
| Message Type | M | | | | YES | reject |
| LPPa Transaction ID | M | | | | — | |
| e-CID Information Type | | 1 to <maxnoeCIDtypes> | | | EACH | reject |
| >e-CID Information Item | M | | ENUMERATED (pci, cellid, earfcn, CoMPstate) | | — | — |

Where, pci indicates a physical cell identifier cellid indicates a cell global identifier earfcn indicates evolved universal terrestrial radio access (Evolved Universal Terrestrial Radio Access, E-UTRA) absolute radio frequency channel number CoMPstate indicates whether the cell provides CoMP serving for the current target UE.

2.2 A new LPPa signaling message E-CID information response (enhanced cell identifier information response) is provided. The eNB can reports its capability to the e-SMLC via the signaling message. After receiving the E-CID information request, the eNB can feed the CoMP state of the target UE back to the e-SMLC via the message E-CID information response. The signaling is shown as follows:

E-CID Information Response

| IE/Group Name | Presence | Range | IE type and reference | Semantics description | Criticality | Assigned Criticality |
|---|---|---|---|---|---|---|
| Message Type | M | | | | YES | reject |
| LPPa Transaction ID | M | | | | — | — |
| e-CID Information Type | | 1 to <maxnoeCIDtypes> | | | EACH | reject |
| >e-CID Information Item | M | | | | — | — |

This message E-CID information response, as an information element (IE, Information Element), corresponds to the above message E-CID information request, and can be used to report the CoMP state of the target UE under the eNB to the e-SMLC.

2.3 In an LPPa signaling message E-CID measurement initiation request (enhanced cell identifier measurement initiation request) of the e-SMLC, the e-SMLC selects, according to the CoMP cell set of the target UE, a cell in the CoMP set and performs e-CID positioning for the UE; and when reporting the measurement result, the eNB can report in the LPPa signaling message E-CID measurement report (enhanced cell identifier measurement report) several times according to the plurality of measurement results.

(3) RRC Signaling

When the eNB notifies the UE of making measurement for a positioning parameter (such as Rx-Tx), the eNB selects a plurality of neighboring cells according to a CoMP serving state of the current target UE, so that the UE can make measurement for the positioning parameter, and the eNB notifies the UE via the RRC signaling message ReportConfigEUTRA information element (report configuration evolved universal terrestrial radio access information element). The signaling message is added with information for identifying the cell collaborating with the UE to make measurement for the positioning parameter, cell-id, earfcn, as shown below, the message provides information for identifying the cell via the information element ENUMERATED {setup, cell-id, earfcn}. The RRC signaling message is shown as follows:

| ReportConfigEUTRA information element |
|---|
| ```
-- ASN1START
ReportConfigEUTRA ::=        SEQUENCE {
    triggerType                  CHOICE {
        event                        SEQUENCE {
            eventId                      CHOICE {
                eventA1                      SEQUENCE {
                    a1-Threshold                 ThresholdEUTRA
                },
                eventA2                      SEQUENCE {
                    a2-Threshold                 ThresholdEUTRA
                },
                eventA3                      SEQUENCE {
                    a3-Offset                    INTEGER (-30..30) ,
                    reportOnLeave                BOOLEAN
                },
                eventA4                      SEQUENCE {
                    a4-Threshold                 ThresholdEUTRA
                },
                eventA5                      SEQUENCE {
                    a5-Threshold1                ThresholdEUTRA,
                    a5-Threshold2                ThresholdEUTRA
                },
                ...,
                eventA6                      SEQUENCE {
                    a6-Offset                    INTEGER (-30..30),
                    a6-ReportOnLeave             BOOLEAN
                }
            },
            hysteresis                   Hysteresis,
            timeToTrigger                TimeToTrigger
        },
        periodical                   SEQUENCE {
            purpose                      ENUMERATED {
                                             reportStrongestCells,
            reportCGI}
        }
    },
    triggerQuantity              ENUMERATED {rsrp, rsrq},
    reportQuantity               ENUMERATED {sameAsTriggerQuantity,
``` |

| ReportConfigEUTRA information element |
| --- |
| both},
   maxReportCells                INTEGER (1..maxCellReport),
   reportInterval                 ReportInterval,
   reportAmount                 ENUMERATED {r1, r2, r4, r8, r16, r32, r64, infinity},
   ...,
   [[ si-RequestForHO-r9       ENUMERATED {setup}    OPTIONAL,-- Cond reportCGI
      ue-RxTxTimeDiffPeriodical-r9   ENUMERATED{setup, cell-id, earfcn} OPTIONAL -- Need OR
   ]],
   [[ includeLocationInfo-r10      ENUMERATED {true}     OPTIONAL,
-- Cond reportMDT
      reportAddNeighMeas-r10     ENUMERATED {setup}    OPTIONAL
-- Need OR
   ]]
}
ThresholdEUTRA ::=         CHOICE{
   threshold-RSRP               RSRP-Range,
   threshold-RSRQ               RSRQ-Range
}
-- ASN1STOP |

In the message, Cell-id indicates a physical cell identifier of the cell relative to which the UE needs to measure the positioning parameter, and earfcn indicates an absolute frequency point of a cell need to be measured by the UE.

When the UE reports the parameter measurement results via the RRC signaling, it is necessary to report the measurement results for the plurality of cells in the CoMP set, and the RRC signaling message MeasResults information element (measurement results information element) can be utilized to report the measurement results. The message MeasResults information element is added with information element allowing the UE to report the measurement results (such as Rx-Tx) relative to the plurality of cells, and the information element can be "MeasResultListForECID-r9::= SEQUENCE (SIZE (1.maxCellReport)) OF MeasResultForECID-r9" and "physCellId PhysCellIdForECID (physical cell identifier physical cell identifier for ECID)" as well as "cgi-Info CellGlobalIdForECID (cell global identifier cell global identifier for ECID)". In the information element "MeasResultListForECID-r9::=SEQUENCE (SIZE (1. . maxCellReport)) OF MeasResultForECID-r9", MeasResultListForECID-r9 indicates a measurement result list for an e-CID positioning manner, and the elements of the list consist of multiple MeasResultForECID-r9 (that is, the measurement result list for the e-CID positioning manner), and the number of the elements in the list is defined by a parameter maxCellReport, which indicates an upper limit of the measuring number in the measurement list. The information element "physCellId PhysCellIdForECID" and "cgi-Info CellGlobalIdForECID" are used to indicate information of identifiers (physical cell ID and/or cell global ID) to the cell to be measured, and particularly, the CGI indicates the cell global identifier. The RRC signaling message MeasResults information element is shown as follows:

| MeasResults information element |
| --- |
| -- ASN1START
MeasResults ::=                         SEQUENCE {
   measId                               MeasId,
   measResultPCell                 SEQUENCE {
      rsrpResult                     RSRP-Range,
      rsrqResult                     RSRQ-Range
   },
   measResultNeighCells          CHOICE {
      measResultListEUTRA         MeasResultListEUTRA,
      measResultListUTRA          MeasResultListUTRA,
      measResultListGERAN         MeasResultListGERAN,
      measResultsCDMA2000         MeasResultsCDMA2000,
      ...
   }                                                OPTIONAL,
   ...,
   [[ measResultForECID-r9         MeasResultForECID-r9
OPTIONAL
   ]],
   [[ locationInfo-r10             LocationInfo-r10
OPTIONAL,
      measResultServFreqList-r10    MeasResultServFreqList-r10
OPTIONAL
   ]]
}
MeasResultListEUTRA ::=          SEQUENCE (SIZE (1..maxCellReport)) OF MeasResultEUTRA
MeasResultEUTRA   ::=   SEQUENCE { |

| MeasResults information element |
|---|

```
  physCellId                        PhysCellId,
  cgi-Info                          SEQUENCE {
    cellGlobalId                      CellGlobalIdEUTRA,
    trackingAreaCode                  TrackingAreaCode,
    plmn-IdentityList                 PLMN-IdentityList2
  OPTIONAL
  }                                                       OPTIONAL,
  measResult                        SEQUENCE {
    rsrpResult                        RSRP-Range
  OPTIONAL,
    rsrqResult                        RSRQ-Range
  OPTIONAL,
    ...,
    [[ additionalSI-Info-r9           AdditionalSI-Info-r9
  OPTIONAL
    ]]
  }
}
MeasResultServFreqList-r10 ::=SEQUENCE (SIZE (1..maxServCell-r10)) OF
MeasResultServFreq-r10
MeasResultServFreq-r10 ::=        SEQUENCE {
  servFreqId                        ServCellIndex-r10,
  measResultSCell                   SEQUENCE {
    rsrpResultSCell                   RSRP-Range,
    rsrgResultSCell                   RSRQ-Range
  }                                                       OPTIONAL,
  measResultBestNeighCell           SEQUENCE {
    physCellId                        physCellId,
    rsrpResultNCell                   RSRP-Range,
    rsrgResultNCell                   RSRQ-Range
  }                                                       OPTIONAL,
  ...
}
MeasResultListUTRA ::=            SEQUENCE (SIZE (1..maxCellReport)) OF
MeasResultUTRA
MeasResultUTRA ::=SEQUENCE {
  physCellId                        CHOICE {
    fdd                               PhysCellIdUTRA-FDD,
    tdd                               PhysCellIdUTRA-TDD
  },
  cgi-Info                          SEQUENCE {
    cellGlobalId                      CellGlobalIdUTRA,
    locationAreaCode                  BIT STRING (SIZE (16))
  OPTIONAL,
    routingAreaCode                   BIT STRING (SIZE (8))
  OPTIONAL,
    plmn-IdentityList                 PLMN-IdentityList2
  OPTIONAL
  }                                                       OPTIONAL,
  measResult                        SEQUENCE {
    utra-RSCP                         INTEGER (-5..91)      OPTIONAL,
    utra-EcN0                         INTEGER (0..49)       OPTIONAL,
    ...,
    [[ additionalSI-Info-r9           AdditionalSI-Info-r9
  OPTIONAL
    ]]
  }
}
MeasResultListGERAN ::=           SEQUENCE (SIZE (1..maxCellReport)) OF
MeasResultGERAN
MeasResultGERAN ::=   SEQUENCE {
  carrierFreq                       CarrierFregGERAN,
  physCellId                        PhysCellIdGERAN,
  cgi-Info                          SEQUENCE {
    cellGlobalId                      CellGlobalIdGERAN,
    routingAreaCode                   BIT STRING (SIZE (8))
  OPTIONAL
  }                                                       OPTIONAL,
  measResult                        SEQUENCE {
    rssi                              INTEGER (0..63),
    ...
  }
}
MeasResultsCDMA2000 ::=           SEQUENCE {
  preRegistrationStatusHRPD           BOOLEAN,
  measResultListCDMA2000              MeasResultListCDMA2000
```

-continued

| MeasResults information element |
|---|

```
}
MeasResultListCDMA2000 ::=        SEQUENCE (SIZE (1..maxCellReport)) OF
MeasResultCDMA2000
MeasResultCDMA2000 ::=   SEQUENCE {
  physCellId                       PhysCellIdCDMA2000,
  cgi-Info                         CellGlobalIdCDMA2000     OPTIONAL,
  measResult                       SEQUENCE {
    pilotPnPhase                   INTEGER (0..32767)
  OPTIONAL,
    pilotStrength                  INTEGER (0..63),
    ...
  }
}
MeasResultListForECID-r9 ::=      SEQUENCE (SIZE (1..maxCellReport)) OF
MeasResultForECID-r9
MeasResultForECID-r9 ::=    SEQUENCE {
  physCellId                       PhysCellIdForECID,
  cgi-Info                         CellGlobalIdForECID,     OPTIONAL,
  ue-RxTxTimeDiffResult-r9         INTEGER (0..4095),
  currentSFN-r9                    BIT STRING (SIZE (10))
}
PLMN-IdentityList2 ::=            SEQUENCE (SIZE (1..5)) OF PLMN-Identity
AdditionalSI-Info-r9 ::=          SEQUENCE {
  csg-MemberStatus-r9              ENUMERATED {member}
  OPTIONAL,
  csg-Identity-r9                  CSG-Identity             OPTIONAL
}
-- ASN1STOP
```

(4) X2 Signaling

A new X2 signaling message E-CID measurement initiation request (enhanced cell identifier measurement initiation request) is provided, and a primary serving eNB can transmit the signaling message to a neighboring eNB to request the neighboring eNB to make positioning measurement (such as e-CID measurement) and report a measurement result of e-CID positioning manner. The primary eNB can forward the X2 signaling message E-CID measurement initiation request to the neighboring eNB, according to the E-CID measurement initiation request received from an e-SMLC.

The signaling message is shown as follows:

E-CID Measurement Initiation Request

A new X2 signaling message E-CID measurement report (enhanced cell identifier measurement report) is provided, and the neighboring eNB can report the measurement results to the primary serving eNB via the signaling message. The signaling message includes various measurement results measured by the neighboring eNB, that is, the measurement result which the neighboring eNB is required to measure, in the X2 signaling message E-CID measurement initiation request. The signaling message is shown as follows:

| IE/Group Name | Presence | Range | IE type and reference | Semantics description | Criticality | Assigned Criticality |
|---|---|---|---|---|---|---|
| Message Type | M | | | | YES | reject |
| LPPa Transaction ID | M | | | | — | — |
| e-SMLC Measurement ID | | | INTEGER(1 . . . 15, . . . ) | | YES | reject |
| Report Characteristics | M | | ENUMERATED(OnDemand, Periodic, . . . ) | | YES | reject |
| Measurement Periodicity | C-ifReport Characteristics Periodic | | ENUMERATED(120 ms, 240 ms, 480 ms, 640 ms, 1024 ms, 2048 ms, 5120 ms, 10240 ms, 1 min, 6 min, 12 min, 30 min, 60 min, . . . ) | | YES | reject |
| Measured Quantities | | 1 to <maxno Meas> | | | EACH | reject |
| >Measured Quantities Item | M | | ENUMERATED (Cell-ID, Angle of Arrival, Timing Advance Type 1, Timing Advance Type 2, RSRP, RSRQ, . . . ) | | — | — |

E-CID Measurement Report

| IE/Group Name | Presence | Range | IE type and reference | Semantics description | Criticality | Assigned Criticality |
|---|---|---|---|---|---|---|
| Message Type | M | | 9.2.3 | | YES | ignore |
| LPPa Transaction ID | M | | 9.2.4 | | — | |
| e-SMLC UE Measurement ID | M | | INTEGER(1 ... 15, ... ) | | YES | reject |
| eNB UE Measurement ID | M | | INTEGER(1 ... 15, ... ) | | YES | reject |
| E-CID Measurement Result | M | | (being consistent with E-CID Measurement Result in TS36.455) | | YES | ignore |

Through the new added X2 signaling, in the X2 signaling message E-CID measurement initiation request of the primary serving base station, the primary serving base station can, according to an indication of the positioning server, notify the eNB in the CoMP cell set of the target UE to perform e-CID positioning; and the eNB can report the measurement results to the primary serving base station in the X2 signaling message E-CID measurement report when reporting the measurement results to the primary serving base station, and then the primary serving base station can report to the positioning server via LPPa signaling.

Figure 6:
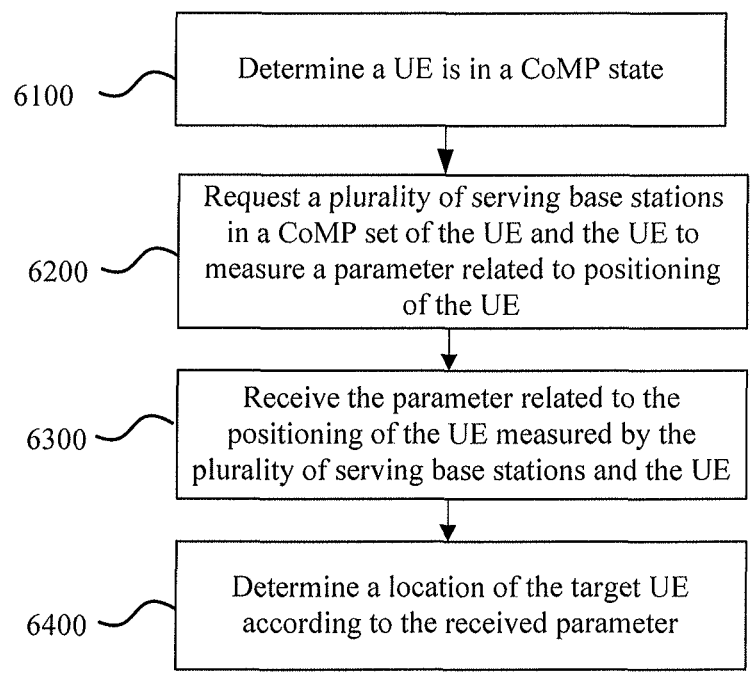
FIG. 6 is schematic block diagram of an exemplary method for positioning, executed by a positioning server according to an embodiment of the present disclosure.

FIG. 6 shows a method for positioning, executed by a positioning server according to an embodiment of the present disclosure. In step 6100, the positioning server (such as e-SMLC) determines whether a UE is in a CoMP state. For example, the positioning server transmits an inquiry message to a primary serving base station (such as eNB) of the UE, for inquiring whether a target UE is in a CoMP scenario; then the positioning server receives a response from the primary serving base station, and determines whether the target UE is in the CoMP scenario according to the response. In step 6200, when determining, according to the response of the primary serving base station, the target UE is in the CoMP scenario, the positioning server requests a plurality of serving base stations in a CoMP set of the target UE and the target UE to measure a parameter related to positioning of the target UE. Here, after the plurality of serving base stations and the target UE receive the positioning measurement request from the positioning server, the target UE and the plurality of serving base stations respectively make positioning measurement, for example, the target UE measures a value of reception time minus transmission time (Rx-Tx) relative to each base station of the plurality of serving base stations, that is, the Rx-Tx value at the UE side described above, and meanwhile, each of the plurality base station measures a value of reception time minus transmission time (Rx-Tx) relative to the target UE, that is, the Rx-Tx value at the base station side described above, and/or an AoA value of the UE relative to the base station. In step 6300, the positioning server receives the measured parameter from the plurality of serving base stations in the CoMP set and the target UE. In step 6400, the positioning server determines a location of the target UE according to the received parameters. For example, as described above, the multiple Rx-Tx values measured by the plurality of serving base stations and the multiple Rx-Tx values measured by the target UE are utilized to respectively obtain distances between the target UE and the plurality of serving base stations, and the distances between the target UE and the plurality of serving base stations and locations of the plurality of base stations are then utilized to obtain a location of the target UE. Or, the location of the target UE can be obtained by the AoAs of the target UE relative to the plurality of serving base stations, and locations of the plurality of base stations. Or, the location of the target UE also can be obtained by utilizing the distances and the AoAs simultaneously.

The method shown in FIG. 6 can be implemented according to the procedure in FIG. 5A to FIG. 5F.

In one embodiment, a positioning server transmits to a primary serving base station of the target UE a positioning measurement request relative to a target UE, and via the primary serving base station, transmits to other serving base station in the CoMP set a positioning measurement request relative to the UE and transmits to the target UE a positioning measurement request relative to the plurality of serving base stations in the CoMP set; other serving base station and the target UE report parameters measured by them to the primary serving base station, the positioning server receives from the primary serving base station the parameters related to positioning of the UE measured by the plurality of serving base stations in the CoMP set and the target UE.

In another embodiment, a positioning server transmits a positioning measurement request relative to a target UE to a primary serving base station of the target UE, and transmits a positioning measurement request relative to the target UE to other serving base station in the CoMP set via the primary serving base station, and the positioning server transmits a positioning measurement request relative to the plurality of serving base stations in the CoMP set to the target UE, so as to instruct the target UE to measure the parameter related to positioning of the target UE relative to the plurality of serving base stations; then the positioning server receives from the target UE the parameter related to positioning of the target UE measured by the target UE relative to the plurality of serving base stations in the CoMP set, and receives from the primary serving base station the parameter related to positioning of the target UE measured by the plurality of serving base stations in the CoMP set, where other serving base station in the CoMP set reports its measuring parameter to the primary serving base station.

In another embodiment, a positioning server transmits a positioning measurement request relative to a target UE to the plurality of serving base stations in the CoMP set, and transmits the positioning measurement request relative to the plurality of serving base stations to the UE via the primary serving base station; then the positioning server receives the parameter related to positioning of the target UE measured by the plurality of serving base stations from the plurality of serving base stations in the CoMP set, and receives from the primary serving base station the parameter related to positioning of the target UE measured by the target UE relative to the plurality of serving base stations and reported to the primary serving base station.

In another embodiment, a positioning server transmits a positioning measurement request relative to a target UE to the plurality of serving base stations in the CoMP set, and transmits the positioning measurement request relative to the plurality of serving base stations in the CoMP set to the target UE; then the positioning server receives, from the plurality of serving base stations in the CoMP set, the parameter related to positioning of the target UE measured by the plurality of serving base stations, and receives from the target UE the parameter related to positioning of the target UE measured by the target UE relative to the plurality of serving base stations in the CoMP set.

In one embodiment, the positioning server is an e-SMLC, the primary serving base station is an eNB, and the other serving base station in the CoMP set is an eNB or an AP.

Figure 7:
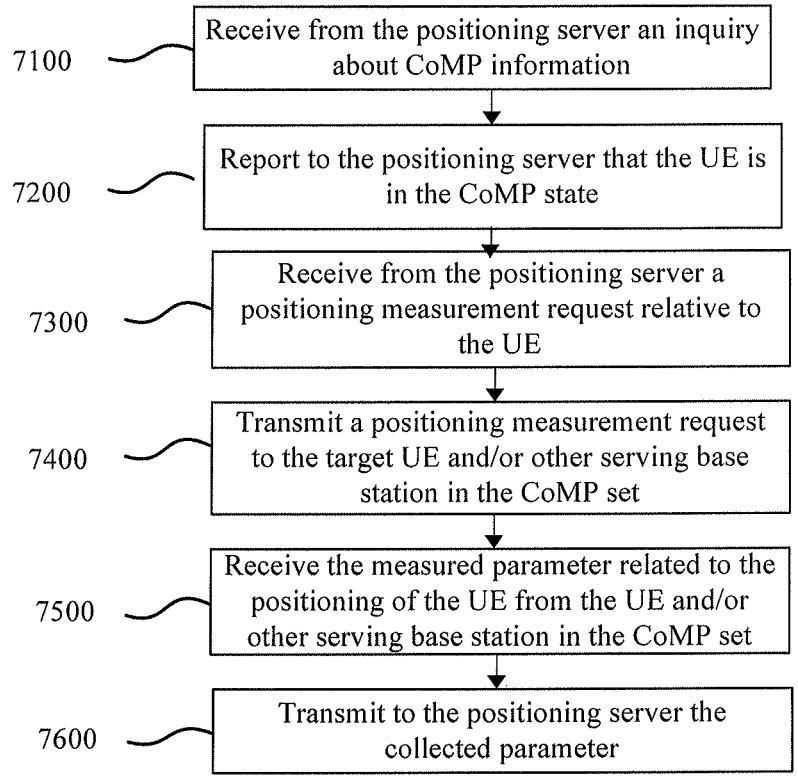
FIG. 7 is schematic block diagram of an exemplary method for helping positioning, executed by a serving base station according to an embodiment of the present disclosure.

FIG. 7 shows a method for helping positioning, executed by a primary serving base station for serving a user equipment (UE) according to an embodiment of the present disclosure. In step 7100, the primary serving base station receives from the positioning server an inquiry message whether the target UE is in a CoMP scenario. In step 7200, the primary serving base station reports to the positioning server that the target UE is in the CoMP scenario. In step 7300, the primary serving base station receives from the positioning server a positioning measurement request relative to the UE, and the positioning measurement request instructs a plurality of serving base stations in the CoMP set to jointly measure the positioning parameter for the target UE. In step 7400, the primary serving base station transmits a positioning measurement request to the target UE, where the positioning measurement request instructs the target UE to measure a parameter related to positioning of the target UE and relative to the plurality of serving base stations in the CoMP set, and/or, the primary serving base station transmits a positioning measurement request to other serving base station in the CoMP set, where the positioning measurement request instructs the other base station to measure the parameter related to positioning and relative to the target UE. The plurality of serving base stations include the primary serving base station and the other serving base station. In step 7500, the primary serving base station receives, from the target UE, the parameter related to the positioning of the target UE measured by the target UE relative to the plurality of serving base stations in the CoMP set, and/or, the primary serving base station receives, from the other serving base station, the parameter related to the positioning of the target UE measured by the other serving base station. In step 7600, the primary serving base station transmits to the positioning server parameters related to the positioning of the target UE, reported by the target UE and/or other serving base station, as well as that measured by the primary serving base station.

Figure 8:
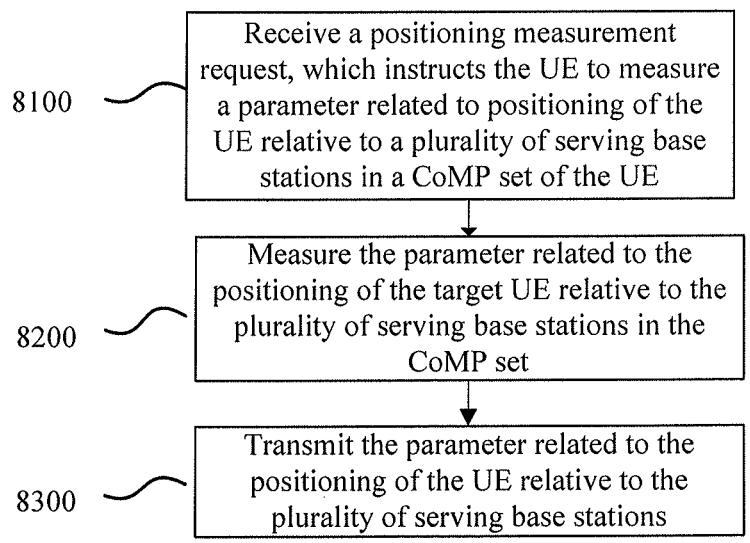
FIG. 8 is schematic block diagram of an exemplary method for helping positioning, executed by a UE according to an embodiment of the present disclosure.

FIG. 8 shows a method for helping positioning, executed by a user equipment (UE) according to an embodiment of the present disclosure. In step 8100, a target UE receives a positioning measurement request, and the positioning measurement request instructs the target UE to measure a parameter related to positioning of the target UE relative to a plurality of serving base stations in a CoMP set of the target UE. In one embodiment, the target UE can receive the positioning measurement request from a primary serving base station in the CoMP set via RRC signaling, or receive the positioning measurement request from a positioning server via LPP signaling. In step 8200, in response to the received positioning measurement request, the target UE measures the parameter related to positioning of the target UE relative to the plurality of serving base stations in the CoMP set, for example, the Rx-Tx value at the UE side measured by the target UE relative to each serving base station of the plurality of serving base stations, as described in FIG. 2. In step 8300, the target UE transmits the parameter related to positioning of the target UE measured by itself relative to the plurality of serving base stations in the CoMP set. In one embodiment, the target UE transmits the measured parameter to the primary serving base station via RRC signaling, and the primary serving base station forwards the measured parameter to the positioning server via LPPa signaling. The target UE also can transmit the measured parameter to the positioning server via LPP signaling.

Figure 9:
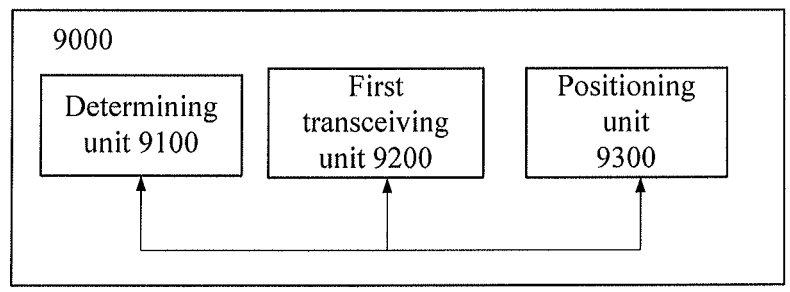
FIG. 9 is a schematic block diagram of a positioning server according to an embodiment of the present disclosure.

FIG. 9 is an apparatus 9000 for positioning a UE according to an embodiment of the present disclosure, which can be a positioning server. The apparatus includes a determining unit 9100, a first transceiving unit 9200 and a positioning unit 9300. According to one embodiment, the determining unit 9100 is configured to determine that the UE is in a CoMP state; the first transceiving unit 9200 is configured to, after the determining unit 9100 determines that the UE is in the CoMP state, transmit a request message to request a plurality of serving base stations in a CoMP set of the UE and the UE to measure a parameter related to positioning of the UE, and receive the parameter related to positioning of the UE from the plurality of serving base stations and the UE; and the positioning unit 9300 is configured to determine a location of the UE according to the parameter received by the first transceiving unit 9200.

According to another embodiment, the determining unit 9100 inquires a primary serving base station of the UE about the CoMP state of the primary serving base station with respect to the UE, and receives the CoMP state information with respect to the UE from the primary serving base station.

According to another embodiment, the first transceiving unit 9200 transmits a positioning measurement request relative to the UE to the primary serving base station of the UE, and transmits a positioning measurement request relative to the UE to other serving base station in the CoMP set via the primary serving base station, and transmits a positioning measurement request relative to the plurality of serving base stations to the UE; and the first transceiving unit 9200 receives from the primary serving base station the parameter related to positioning of the UE measured by the plurality of serving base stations and the UE, where the other serving base station and the UE report their measuring parameter to the primary serving base station. For example, the positioning server can be an e-SMLC, the primary serving base station can be an eNB, and the other serving base station in the CoMP set can be an eNB or an AP.

In this embodiment, the first transceiving unit 9200 can, via LPPa signaling, transmit a positioning measurement request relative to the UE to the primary serving base station and receive the parameter related to positioning of the UE from the primary serving base station, where the primary serving base station, via RRC signaling, transmits a positioning measurement request relative to the plurality of serving base stations to the UE, and receives from the UE the parameter related to positioning of the UE measured by the UE, where, when the other serving base station is an eNB, the primary serving base station, via X2 interface signaling, transmits the positioning measurement request relative to the UE to other serving base station and receives from the other serving base station the parameter related to positioning of the UE measured by the other serving base station.

According to another embodiment, the first transceiving unit 9200 transmits a positioning measurement request relative to the UE to the primary serving base station of the UE, and, via the primary serving base station, transmits a positioning measurement request relative to the UE to other serving base station in the CoMP set; the first transceiving unit 9200 transmits a positioning measurement request relative to the plurality of serving base stations, to the UE; the first transceiving unit 9200 receives from the primary serving base station the parameter related to positioning of the UE measured by the plurality of serving base stations, and other serving base station reports its measuring parameter to the primary serving base station; and the first transceiving unit 9200 receives from the UE the parameter related to positioning of the UE measured by the UE relative to the plurality of serving base stations.

In this embodiment, the first transceiving unit 9200 can, via LPPa signaling, transmit a positioning measurement request relative to the UE to the primary serving base station and receive the parameter related to positioning of the UE measured by the plurality of serving base stations from the primary serving base station; the first transceiving unit 9200 can, via LPP signaling, transmit the positioning measurement request relative to the plurality of serving base stations to the UE, and receive from the UE the parameter related to positioning of the UE measured by the UE relative to the plurality of serving base stations, where, when the other serving base station is an eNB, the primary serving base station, via X2 interface signaling, transmits the positioning measurement request relative to the UE to other serving base station and receives from the other serving base station the parameter related to positioning of the UE measured by the other serving base station.

According to another embodiment, the first transceiving unit 9200 transmits a positioning measurement request relative to the UE to the plurality of serving base stations, and, via the primary serving base station, transmits the positioning measurement request relative to the plurality of serving base stations to the UE; the first transceiving unit 9200 receives the parameter related to positioning of the UE measured by the plurality of serving base stations from the plurality of serving base stations, and the first transceiving unit 9200 receives from the primary serving base station the parameter related to positioning of the UE measured by the UE relative to the plurality of serving base stations and reported to the primary serving base station.

In this embodiment, the first transceiving unit 9200 can, via LPPa signaling, transmit the positioning measurement request relative to the UE to the plurality of serving base stations and receive the parameter related to positioning of the UE measured by the plurality of serving base stations from the plurality of serving base stations, where the primary serving base station, via RRC signaling, transmits the positioning measurement request relative to the plurality of serving base stations to the UE and receives the parameter related to positioning of the UE measured by the UE relative to the plurality of serving base stations, and the first transceiving unit 9200 can, via LPPa signaling, receive from the primary serving base station the parameter related to positioning of the UE measured by the UE relative to the plurality of serving base stations and reported to the primary serving base station.

According to another embodiment, the first transceiving unit 9200 transmits a positioning measurement request relative to the UE to the plurality of serving base stations, and the first transceiving unit 9200 transmits the positioning measurement request relative to the plurality of serving base stations to the UE; the first transceiving unit 9200 receives the parameter related to positioning of the UE measured by the plurality of serving base stations from the plurality of serving base stations, and the first transceiving unit 9200 receives from the UE the parameter related to positioning of the UE measured by the UE relative to the plurality of serving base stations.

In this embodiment, the first transceiving unit 9200 can, via LPPa signaling, transmit a positioning measurement request relative to the UE to the plurality of serving base stations and receive the parameter related to positioning of the UE measured by the plurality of serving base stations from the plurality of serving base stations, and the first transceiving unit 9200 can, via LPP signaling, transmit the positioning measurement request relative to the plurality of serving base stations to the UE and receive from the UE the parameter related to positioning of the UE measured by the UE relative to the plurality of serving base stations.

Figure 10:
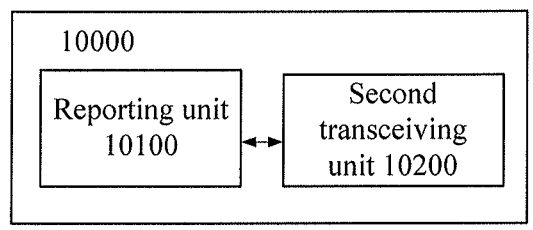
FIG. 10 is a schematic block diagram of a serving base station according to an embodiment of the present disclosure.

FIG. 10 is an apparatus 10000 for helping positioning a UE according to an embodiment of the present disclosure, which can be a primary serving base station for serving a target UE. The apparatus includes a reporting unit 10100 and a second transceiving unit 10200. According to one embodiment, the second transceiving unit 10200 is configured to receive from a positioning server an inquiry message whether the target UE is in a CoMP state. The reporting unit 10100 is configured to, in response to the inquiry message received by the second transceiving unit 10200, report to the positioning server that the UE is in the CoMP state. The second transceiving unit 10200 is configured to receive a positioning measurement request relative to the UE from the positioning server; transmit a positioning measurement request to the UE and/or other serving base station in the CoMP set; receive, from the UE and/or the other serving base station, the parameter related to positioning of the UE measured by the UE relative to the plurality of serving base stations in the CoMP set and/or the parameter related to positioning of the UE measured by the other serving base station relative to the UE, where the plurality of serving base stations include the primary serving base station and other serving base station; and transmit, to the positioning server, the parameter related to positioning of the UE measured by the primary serving base station and the parameter related to positioning of the UE measured by the UE and/or the other serving base station.

According to one embodiment, the second transceiving unit 10200 can, via LPPa signaling, receive a positioning measurement request relative to the UE from the positioning server and transmit to the positioning server the parameter measured by the primary serving base station and the parameter measured by the UE and/or the other serving base station; the second transceiving unit 10200 can, via RRC signaling, transmit a positioning measurement request relative to the UE and receive the parameter measured by the UE from the UE; and the second transceiving unit 10200 can, via X2 interface signaling, transmit a positioning measurement request to other serving base station and receive from the other serving base station the parameter measured by the other serving base station.

Figure 11:
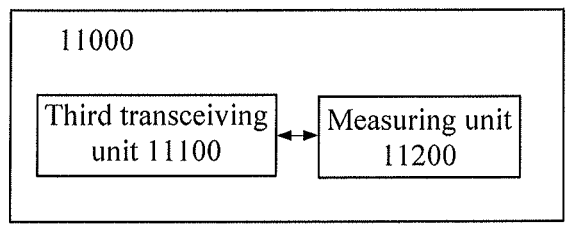
FIG. 11 is a schematic block diagram of a UE according to an embodiment of the present disclosure.

FIG. 11 is an apparatus 11000 for helping positioning a UE according to an embodiment of the present disclosure, which can be a UE. The apparatus includes a third transceiving unit 11100 and a measuring unit 11200. According to one embodiment, the third transceiving unit 11100 is configured to receive a positioning measurement request, where the positioning measurement request instructs the UE to measure a parameter related to positioning of the UE relative to a plurality of serving base stations in a CoMP set of the UE. The measuring unit 11200 is configured to measure the parameter related to positioning of the UE relative to the plurality of serving base stations, according to the positioning measurement request received by the third transceiving unit 11100. The third transceiving unit 11100 transmits the parameter related to positioning of the UE measured by the measuring unit relative to the plurality of serving base stations.

According to another embodiment, the third transceiving unit 11100 can receive the positioning measurement request from the primary serving base station in the plurality of serving base stations via RRC signaling; and transmit the parameter to the primary serving base station via RRC signaling, where the primary serving base station transmits the parameter to the positioning server via LPPa signaling.

In another embodiment, the third transceiving unit 11100 can receive the positioning measurement request from the positioning server via LPP signaling; and transmit the parameter to the positioning server via LPP signaling.

The units in FIG. 9, FIG. 10 and FIG. 11 can include processors, electronic devices, hardware devices, electronic components, logic circuits, memories, or any combination thereof, or can be implemented in the above devices. It can be appreciated by persons skilled in the art that, various units shown in FIGS. 9-11 can perform corresponding processes in the method as described above with reference to FIGS. 6-8 and 5A-5F.

Figure 12:
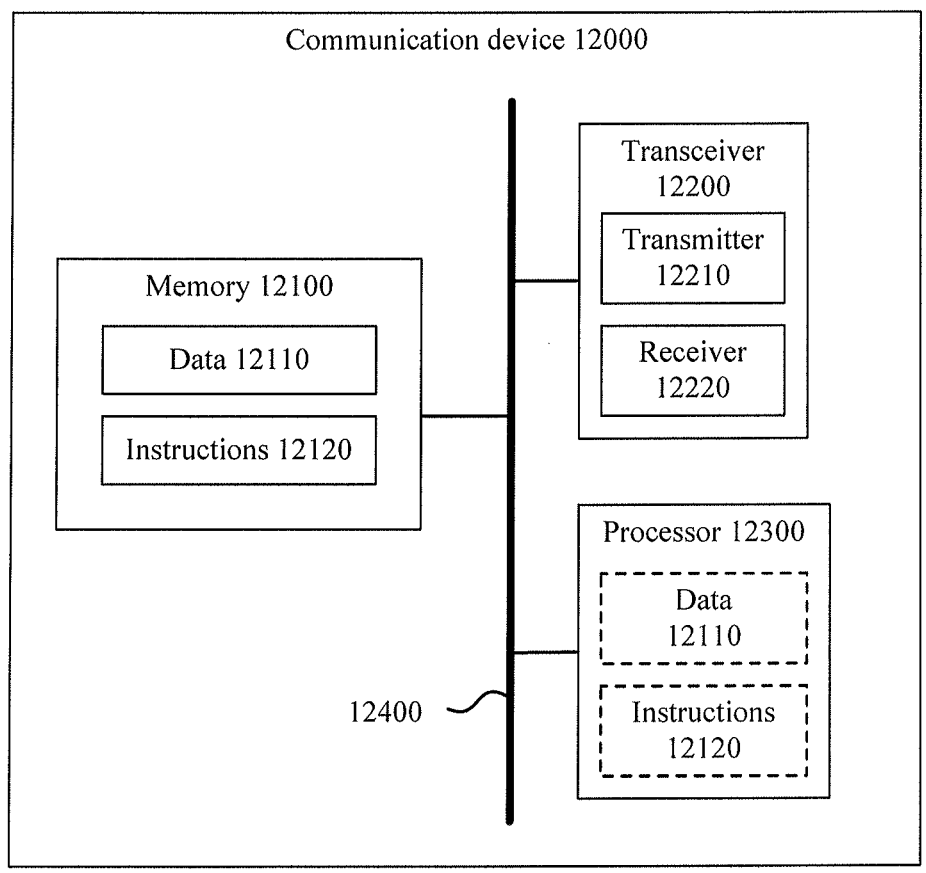
FIG. 12 is a schematic diagram of an exemplary communication device applicable in the present disclosure.

FIG. 12 shows a communication device 12000 according to an embodiment of the present disclosure, which can be applicable to the positioning server, the serving base station or the UE in the present disclosure.

The communication device includes various components connected via a bus 12400, such as a processor 12300, a memory 12100 and a transceiver 12200. The memory 12100 can store data 12110 and instructions 12120. The processor 12300 can implement the method disclosed in the present disclosure by executing the instructions 12120 and using the data 12110. The transceiver 12200 includes a transmitter 12210 and a receiver 12220, so that signals can be transmitted and received between the communication device and other communication device.

According to one embodiment, the wireless device shown in FIG. 12 is a positioning server, which includes a processor 12300 and a memory 12100 connected with the processor, where, the processor is configured to: determine a target UE is in a CoMP scenario state; request a plurality of serving base stations in a CoMP set of the target UE and the target UE to measure a parameter related to positioning of the target UE; receive the parameter related to positioning of the target UE from the plurality of serving base stations and the target UE; and determine a location of the target UE according to the received parameter.

In one variant of this embodiment, the processor can be further configured to inquiry the primary serving base station of the target UE about a CoMP state of the primary serving base station with respect to the target UE; and receive CoMP state information with respect to the target UE from the primary serving base station.

In another variant of this embodiment, the processor can be further configured to respectively obtain RTT values between the target UE and the plurality of serving base stations by using the multiple Rx-Tx values measured by the plurality of serving base stations and the multiple Rx-Tx values measured by the target UE, and obtain a location of the target UE by using the RTT values between the target UE and the plurality of serving base stations and locations of the plurality of base stations. The processor can be further configured to obtain the location of the target UE by using the AoA of the target UE relative to the plurality of serving base stations, and locations of the plurality of base stations.

In another variant of this embodiment, the processor can be further configured to transmit a positioning measurement request relative to the target UE to the primary serving base station of the target UE, and transmit via the primary serving base station a positioning measurement request relative to the target UE to other serving base stations in the CoMP set, and a positioning measurement request relative to the plurality of serving base stations to the target UE; and receive from the primary serving base station the parameter related to positioning of the target UE measured by the plurality of serving base stations and the target UE, where other serving base station and the target UE report their measuring parameter to the primary serving base station. For example, the positioning server can be an e-SMLC, the primary serving base station can be an eNB, and the other serving base station in the CoMP set can be an eNB or an AP. In this variant, the processor can be further configured to transmit, via LPPa signaling, a positioning measurement request relative to the target UE to the primary serving base station and receive the parameter related to positioning of the UE from the primary serving base station, where the primary serving base station can, via RRC signaling, transmit the positioning measurement request relative to the plurality of serving base stations to the target UE and receive from the target UE the parameter related to positioning of the target UE measured by the target UE, where, when the other serving base station is the eNB, the primary serving base station can transmit the positioning measurement request relative to the target UE to other serving base station and receive from the other serving base station the parameter related to positioning of the target UE measured by the other serving base station, via X2 interface signaling.

In another variant of this embodiment, the processor can be further configured to transmit a positioning measurement request relative to the target UE to the primary serving base station of the target UE, and transmit a positioning measurement request relative to the target UE to other serving base station in the CoMP set via the primary serving base station; transmit a positioning measurement request relative to the plurality of serving base stations to the target UE; receive from the primary serving base station the parameter related to positioning of the target UE measured by the plurality of serving base stations, where the other serving base station reports the parameter measured by itself to the primary serving base station; and receive from the target UE the parameter related to positioning of the target UE measured by the target UE relative to the plurality of serving base stations. For example, the positioning server can be an e-SMLC, the primary serving base station is an eNB, and the other serving base station in the CoMP set is an eNB or an AP. In this variant, the processor can be further configured to, via LPPa signaling, transmit a positioning measurement request relative to the target UE to the primary serving base station and receive the parameter related to positioning of the UE measured by the plurality of serving base stations from the primary serving base station, via LPP signaling, transmit the positioning measurement request relative to the plurality of serving base stations to the target UE and receive from the target UE the parameter related to positioning of the target UE measured by the target UE relative to the plurality of serving base stations, where, when the other serving base station is the eNB, the primary serving base station is via X2 interface signaling to transmit the positioning measurement request relative to the target UE to other serving base station and receive from the other serving base station the parameter related to positioning of the target UE measured by the other serving base station.

In another variant of this embodiment, the processor can be further configured to transmit a positioning measurement request relative to a target UE to the plurality of serving base stations, and transmit the positioning measurement request relative to the plurality of serving base stations to the target UE via the primary serving base station; receive the parameter related to positioning of the target UE measured by the plurality of serving base stations from the plurality of serving base stations, and receive from the primary serving base station the parameter related to positioning of the target UE measured by the target UE relative to the plurality of serving base stations and reported to the primary serving base station. For example, the positioning server can be an e-SMLC, and the plurality of serving base station in the CoMP set can be an eNB. In this variant, the processor can be further configured to, via LPPa signaling, transmit a positioning measurement request relative to the target UE to the plurality of serving base stations and receive the parameter related to positioning of the target UE measured by the plurality of serving base stations from the plurality of serving base stations, where, the primary serving base station, via RRC signaling, transmits the positioning measurement request relative to the plurality of serving base stations to the target UE, and receives from the target UE the parameter related to positioning of the target UR measured by the target UE relative to the plurality of serving base stations, where, the processor can be further configured to, via LPPa signaling, receive from the primary serving base station the parameter related to positioning of the target UE measured by the target UE relative to the plurality of serving base stations and reported to the primary serving base station.

In another variant of this embodiment, the processor can be further configured to transmit a positioning measurement request relative to a target UE to the plurality of serving base stations, and transmit the positioning measurement request relative to the plurality of serving base stations to the target UE; receive the parameter related to positioning of the target UE measured by the plurality of serving base stations from the plurality of serving base stations, and receive from the target UE the parameter related to positioning of the target UE measured by the target UE relative to the plurality of serving base stations. For example, the positioning server can be an e-SMLC, and the plurality of serving base station in the CoMP set can be an eNB. In this variant, the processor can be further configured to, via LPPa signaling, transmit a positioning measurement request relative to the target UE to the plurality of serving base stations and receives the parameter related to positioning of the target UE measured by the plurality of serving base stations from the plurality of serving base stations; via LPP signaling, transmit the positioning measurement request relative to the plurality of serving base stations to the target UE and receive from the target UE the parameter related to positioning of the target UE measured by the target UE relative to the plurality of serving base stations.

According to another embodiment, the wireless device shown in FIG. 12 is a base station, such as a primary serving base station of the target UE, which includes a processor 12300 and a memory 12100 connected with the processor, where, the processor is configured to: receive, from a positioning server an inquiry message whether the target UE is in a CoMP state; report to the positioning server that the target UE is in the CoMP scenario, in response to the inquiry message; receive a positioning measurement request relative to the target UE from the positioning server; transmit a positioning measurement request to the target UE and/or other serving base station in the CoMP set; receive, from the target UE and/or the other serving base station, the parameter measured by the target UE relative to the plurality of serving base stations in the CoMP set and/or the parameter measured by the other serving base station relative to the UE, where the plurality of serving base stations include the primary serving base station and other serving base station, and transmit, to the positioning server, the parameter related to positioning of the target UE measured by the primary serving base station and the parameter measured by the target UE and/or the other serving base station.

In this embodiment, the positioning server can be an e-SMLC, and the primary serving base station can be an eNB. The processor can be further configured to, via LPPa signaling, receive a positioning measurement request relative to the target UE from the positioning server and transmit to the positioning server the parameter measured by the primary serving base station and the parameter measured by the target UE and/or the other serving base station; via RRC signaling, transmit a positioning measurement request to the target UE and receive the parameter measured by the target UE from the target UE; and, via X2 interface signaling, transmit a positioning measurement request to other serving base station and receive from the other serving base station the parameter measured by the other serving base station.

According to another embodiment, the wireless device shown in FIG. 12 is a UE, which includes a processor 12300 and a memory 12100 connected with the processor, where, the processor is configured to: receive a positioning measurement request, where the positioning measurement request instructs the UE to measure a parameter related to positioning of the UE relative to a plurality of serving base stations in a CoMP set of the UE; according to the positioning measurement request, measure the parameter related to positioning of the UE relative to the plurality of serving base stations in the CoMP set of the UE; and transmit the parameter related to positioning of the UE measured by the UE relative to the plurality of serving base stations.

In one variant of this embodiment, the processor can be further configured to receive the positioning measurement request from the primary serving base station in the plurality of serving base stations via RRC signaling; and transmit to the primary serving base station via RRC signaling the parameter related to positioning of the target UE measured by the target UE relative to the plurality of serving base stations, where the primary serving base station transmits the parameter to the positioning server via LPPa signaling.

In another variant of this embodiment, the processor can be further configured to receive the positioning measurement request from the positioning server via LPP signaling; and transmit to the positioning server via LPP signaling the parameter related to positioning of the target UE measured by the target UE relative to the plurality of serving base stations.

It can be appreciated by persons skilled in the art that, the wireless device shown in FIG. 12 can perform corresponding processes in the method as described above with reference to FIGS. 6-8 and 5A-5F via the processor 12300.

The steps of the method described herein can be embodied directly in hardware, in software executed by a processor, or in a combination of the two, and the software can be located in a storage medium. Therefore, the essence of the technical solution of the present disclosure, or its contribution to the prior art, or all or a part of the technical solutions, may be embodied in a software product. The computer software product may be stored in a storage medium and incorporates several instructions for instructing a computer device (for example, personal computer, server, or network device) to execute all or part of the steps of the method specified in any embodiment of the present disclosure. Examples of the storage medium include various media capable of storing program codes, such as a USB flash disk, a mobile hard disk, a read-only memory (ROM, Read-Only Memory), a random access memory (RAM, Random Access Memory), a magnetic disk, or an optical disk.

The previous description of the specific embodiments is provided to enable any person skilled in the art to implement or use the present disclosure. However, various modifications within a general principle of the present disclosure to embodiments of the present disclosure also fall within the protection scope of the present disclosure.

What is claimed is:

1. A positioning method implemented in a positioning server, comprising:
    determining, by the positioning server, that a user equipment (UE) is in a coordinated multi-point transmission (CoMP) state;
    transmitting, by the positioning server, to a plurality of serving base stations in a CoMP set of the UE, a positioning measurement request relative to the UE, and transmitting, to the UE via a primary serving base station, a positioning measurement request relative to the plurality of serving base stations;
    receiving, by the positioning server, from the plurality of serving base stations a plurality of parameters related to the positioning of the UE measured by the plurality of serving base stations;
    receiving, by the positioning server, from the primary serving base station a plurality of parameters related to the positioning of the UE measured by the UE relative to the plurality of serving base stations and reported to the primary serving base station; and
    determining, by the positioning server, a location of the UE according to the received plurality of parameters related to the positioning of the UE measured by the plurality of serving base stations and the received plurality of parameters related to the positioning of the UE measured by the UE.

2. The method according to claim 1, wherein:
    the plurality of parameters measured by the plurality of serving base stations comprise at least one of the following: a value of a reception time minus a transmission time (Rx-Tx) measured by each serving base station of the plurality of serving base stations, relative to the UE, and an angle of arrival (AoA) of the UE measured by each serving base station of the plurality of serving base stations; and
    the plurality of parameters measured by the UE comprise: a value of a reception time minus a transmission time (Rx-Tx) measured by the UE relative to each serving base station of the plurality of serving base stations.

3. The method according to claim 1, wherein the positioning server is an Enhanced Serving Mobile Location Centre (e-SMLC), and the plurality of serving base stations in the CoMP set are Evolved Node Bs (eNBs),
    the positioning server transmits the positioning measurement request relative to the UE to the plurality of serving base stations and receives from the plurality of serving base stations the plurality of parameters related to the positioning of the UE measured by the plurality of serving base stations, via LTE positioning protocol a (LPPa) signaling,
    wherein, the primary serving base station transmits the positioning measurement request relative to the plurality of serving base stations to the UE and receives from the UE the plurality of parameters related to the positioning of the UE measured by the UE relative to the plurality of serving base stations, via radio resource control (RRC) signaling,
    wherein, the positioning server receives, from the primary serving base station, via LPPa signaling, the plurality of parameters related to the positioning of the UE measured by the UE relative to the plurality of serving base stations and reported to the primary serving base station.

4. A method for positioning a user equipment (UE), implemented in a primary serving base station serving the UE, comprising:
    receiving, by the primary serving base station, an inquiry message whether the UE is in a coordinated multi-point transmission (CoMP) state;
    reporting, by the primary serving base station, that the UE is in the CoMP state;
    receiving, by the primary serving base station, a positioning measurement request relative to the UE;
    transmitting, to at least one of the UE and other serving base station in the CoMP set, the positioning measurement request;
    receiving, by the primary serving base station, a plurality of parameters related to positioning of the UE measured by the UE relative to a plurality of serving base stations in the CoMP set and a plurality of parameters related to the positioning of the UE measured by the other serving base station relative to the UE, wherein the plurality of serving base stations comprise the primary serving base station and the other serving base station;
    transmitting, by the primary serving base station, the plurality of parameters related to the positioning of the UE measured by the primary serving base station and the plurality of parameters related to the positioning of the UE measured by the UE and the other serving base station.

5. The method according to claim 4, wherein:
    the plurality of parameters measured by the plurality of serving base stations, comprises at least one of the following: a value of a reception time minus a transmission time (Rx-Tx) measured by each serving base station of the plurality of serving base stations relative to the UE, and an angle of arrival (AoA) of the UE measured by each serving base station of the plurality of serving base stations; and
    the plurality of parameters measured by the UE relative to the plurality of serving base stations comprises: a value of a reception time minus a transmission time (Rx-Tx) measured by the UE relative to each serving base station of the plurality of serving base stations.

6. A positioning server, comprising a hardware processor and a non-transitory storage medium accessible to the hardware processor, the non-transitory storage medium comprising:
    a determining unit, configured to determine that a user equipment (UE) is in a coordinated multi-point transmission (CoMP) state;

wherein the positioning server further comprises:
transceiver, configured to, after the determining unit determines that the UE is in the CoMP state, transmit a positioning measurement request relative to the UE to a plurality of serving base stations in a CoMP set of the UE, and transmit the positioning measurement request relative to the plurality of serving base stations to the UE via the primary serving base station; receive from the plurality of serving base stations a plurality of parameters related to the positioning of the UE measured by the plurality of serving base stations; receive from the primary serving base station a plurality of parameters related to the positioning of the UE measured by the UE relative to the plurality of serving base stations and reported to the primary serving base station; and the non-transitory storage medium further comprises:
a positioning unit, configured to determine a location of the UE according to the plurality of parameters related to the positioning of the UE measured by the plurality of serving base stations and plurality of parameters related to the positioning of the UE measured by the UE received by the transceiver.

7. The positioning server according to claim 6, wherein:
the plurality of parameters measured by the plurality of serving base stations comprise at least one of the following: a value of a reception time minus a transmission time (Rx-Tx) measured by each serving base station of the plurality of serving base stations relative to the UE, and an angle of arrival (AoA) of the UE measured by each serving base station of the plurality of serving base stations; and
the plurality of parameters measured by the UE comprise: a value of a reception time minus a transmission time (Rx-Tx) value measured by the UE relative to each serving base station of the plurality of serving base stations.

8. The positioning server according to claim 6, wherein the positioning server is an Serving Mobile Location Centre (e-SMLC), and the plurality of serving base stations in the CoMP set are Evolved Node Bs (eNBs),
the transceiver transmits the positioning measurement request relative to the UE to the plurality of serving base stations and receives from the plurality of serving base stations the plurality of parameters related to the positioning of the UE measured by the plurality of serving base stations, via LTE positioning protocol a (LPPa) signaling,
wherein, the primary serving base station transmits the positioning measurement request relative to the plurality of serving base stations to the UE and receives from the UE the plurality of parameters related to the positioning of the UE measured by the UE relative to the plurality of serving base stations, via radio resource control (RRC) signaling,
wherein, the transceiver receives, from the primary serving base station, via LPPa signaling, the plurality of parameters related to the positioning of the UE measured by the UE relative to the plurality of serving base stations and reported to the primary serving base station.

9. A primary serving base station for serving a user equipment (UE), comprising:
a transceiver, configured to receive, from a positioning server, an inquiry message whether the UE is in a coordinated multi-point transmission (CoMP) state; and
a processor, configured to, in response to the inquiry message received by the transceiver, report to the positioning server that the UE is in the CoMP state;
wherein the transceiver is further configured to:
receive, from the positioning server, a positioning measurement request relative to the UE;
transmit, to at least one of the UE and other serving base station in the CoMP set, the positioning measurement request;
receive, from the UE and the other serving base station, a plurality of parameters related to positioning of the UE measured by the UE relative to a plurality of serving base stations in the CoMP set and a plurality of parameters related to the positioning of the UE measured by the other serving base station relative to the UE, wherein the plurality of serving base stations comprise the primary serving base station and the other serving base station;
transmit, to the positioning server, the plurality of parameters related to the positioning of the UE measured by the primary serving base station and the plurality of parameters related to the positioning of the UE measured by the UE and the other serving base station.

* * * * *